US011029875B2

(12) United States Patent
Patel et al.

(10) Patent No.: US 11,029,875 B2
(45) Date of Patent: Jun. 8, 2021

(54) SYSTEM AND METHOD FOR DATA STORAGE IN DISTRIBUTED SYSTEM ACROSS MULTIPLE FAULT DOMAINS

(71) Applicant: Dell Products L.P., Hopkinton, MA (US)

(72) Inventors: Dharmesh M Patel, Round Rock, TX (US); Rizwan Ali, Cedar Park, TX (US); Ravikanth Chaganti, Bangalore (IN)

(73) Assignee: Dell Products L.P., Hopkinton, MA (US)

(*) Notice: Subject to any disclaimer, the term of this patent is extended or adjusted under 35 U.S.C. 154(b) by 40 days.

(21) Appl. No.: 16/145,336

(22) Filed: Sep. 28, 2018

(65) Prior Publication Data
US 2020/0104049 A1 Apr. 2, 2020

(51) Int. Cl.
*G06F 3/06* (2006.01)
*G06F 9/50* (2006.01)

(52) U.S. Cl.
CPC ............ *G06F 3/065* (2013.01); *G06F 3/0604* (2013.01); *G06F 3/067* (2013.01); *G06F 3/0679* (2013.01); *G06F 9/5016* (2013.01)

(58) Field of Classification Search
CPC ........ G06F 3/065; G06F 3/0679; G06F 3/067; G06F 3/0604; G06F 9/5016
See application file for complete search history.

(56) References Cited

U.S. PATENT DOCUMENTS

| | | | |
|---|---|---|---|
| 6,477,628 B1* | 11/2002 | Bish | G06F 3/0613 711/154 |
| 6,671,705 B1* | 12/2003 | Duprey | G06F 11/2058 |
| 7,222,127 B1 | 5/2007 | Bem et al. | |
| 7,516,362 B2 | 4/2009 | Connelly et al. | |
| 7,987,353 B2 | 7/2011 | Holdaway et al. | |
| 8,386,930 B2 | 2/2013 | Dillenberger et al. | |
| 8,401,982 B1 | 3/2013 | Satish et al. | |
| 8,583,769 B1 | 11/2013 | Peters et al. | |
| 8,868,987 B2 | 10/2014 | Wagner | |
| 8,874,892 B1 | 10/2014 | Chan et al. | |
| 9,122,501 B1 | 9/2015 | Hsu et al. | |
| 9,201,751 B1 | 12/2015 | Muthirisavenugopal et al. | |
| 9,278,481 B2 | 3/2016 | Hull | |

(Continued)

FOREIGN PATENT DOCUMENTS

WO 2017/122043 A1 7/2017

OTHER PUBLICATIONS

Extended European Search Report issued in corresponding European Application No. 19198034.1, dated Jan. 20, 2020.

*Primary Examiner* — Tasnima Matin
(74) *Attorney, Agent, or Firm* — Chamberlain, Hrdlicka, White, Williams & Aughtry

(57) ABSTRACT

A data storage system includes an accelerator pool and data silos. The accelerator pool obtains a data storage request for first data; stores a copy of the first data locally in a memory of the accelerator pool; in response to storing the copy of the first data: sends an acknowledgement to a requesting entity that generated the data storage request; and, after sending the acknowledgement, stores at least one second copy of the first data in the data silos. The acknowledgement indicates that the first data is redundantly stored in at least two different fault domains.

20 Claims, 19 Drawing Sheets

(56) References Cited

U.S. PATENT DOCUMENTS

| | | | |
|---|---|---|---|
| 9,355,036 | B2 | 5/2016 | Beard et al. |
| 9,898,224 | B1 | 2/2018 | Marshak et al. |
| 9,986,028 | B2 | 5/2018 | Cayton et al. |
| 10,057,184 | B1 | 8/2018 | Prahlad et al. |
| 10,097,620 | B2 | 10/2018 | Reddy et al. |
| 2005/0050288 | A1* | 3/2005 | Takahashi ............... G06F 3/061 711/162 |
| 2005/0132250 | A1* | 6/2005 | Hansen ............... G06F 11/2097 714/5.11 |
| 2007/0050573 | A1* | 3/2007 | Arakawa ............. G06F 11/2058 711/162 |
| 2012/0303912 | A1* | 11/2012 | Calder .................. G06F 3/0623 711/162 |
| 2015/0100826 | A1 | 4/2015 | Vujic et al. |
| 2015/0278019 | A1 | 10/2015 | Fagiano et al. |

\* cited by examiner

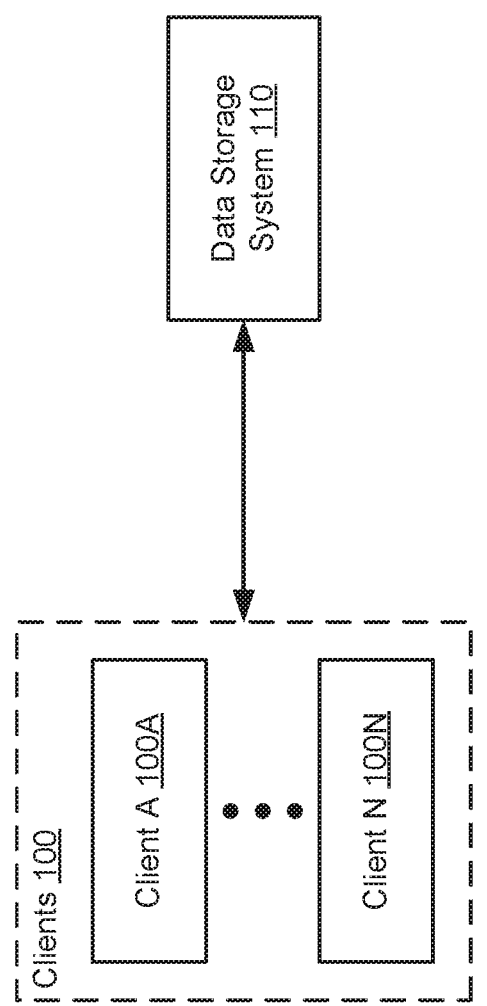
FIG. 1.1

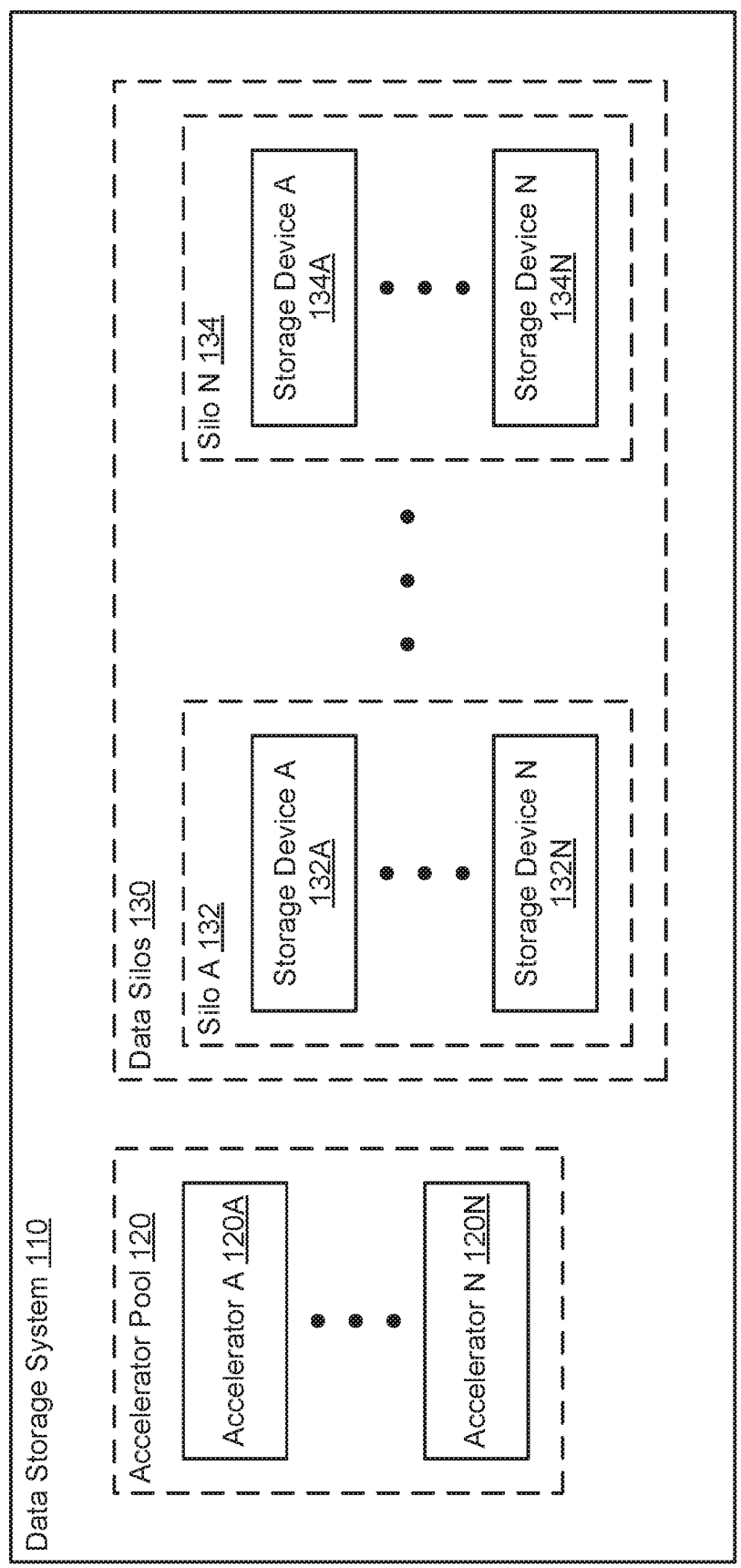
FIG. 1.2

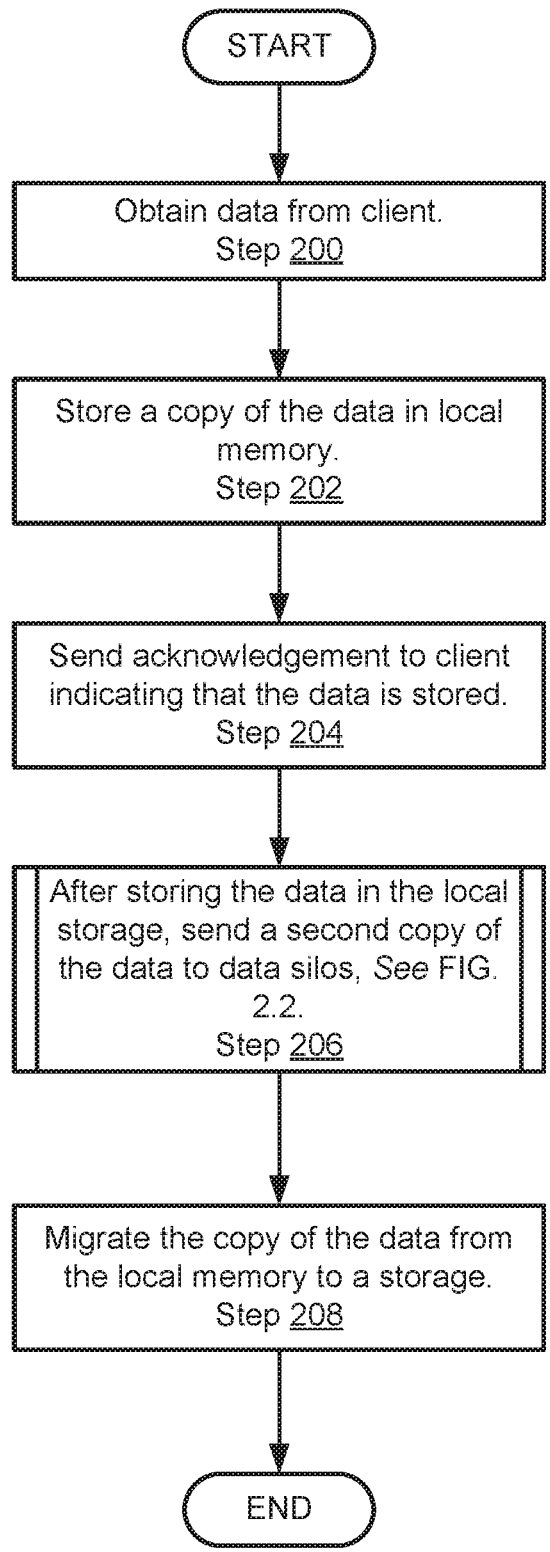
FIG. 2.1

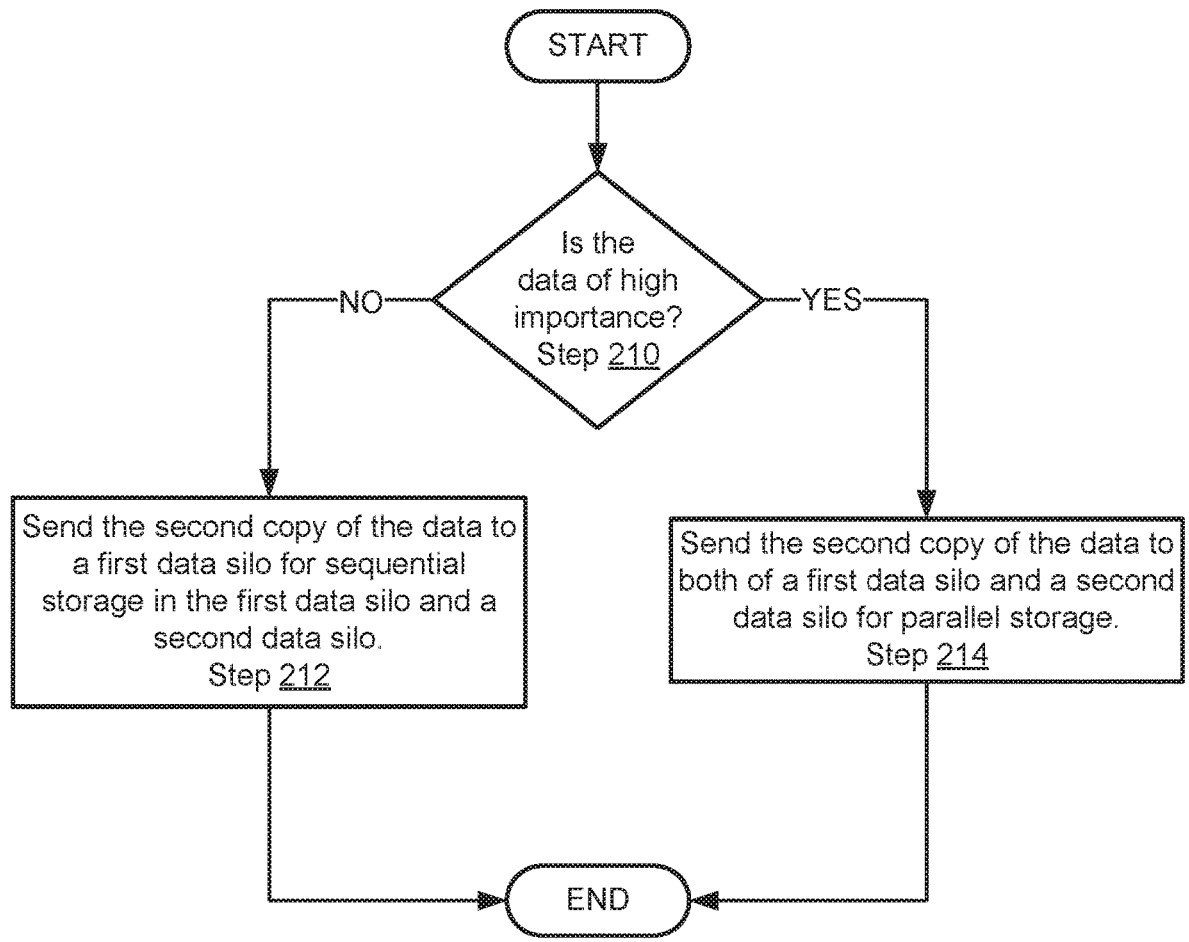
FIG. 2.2

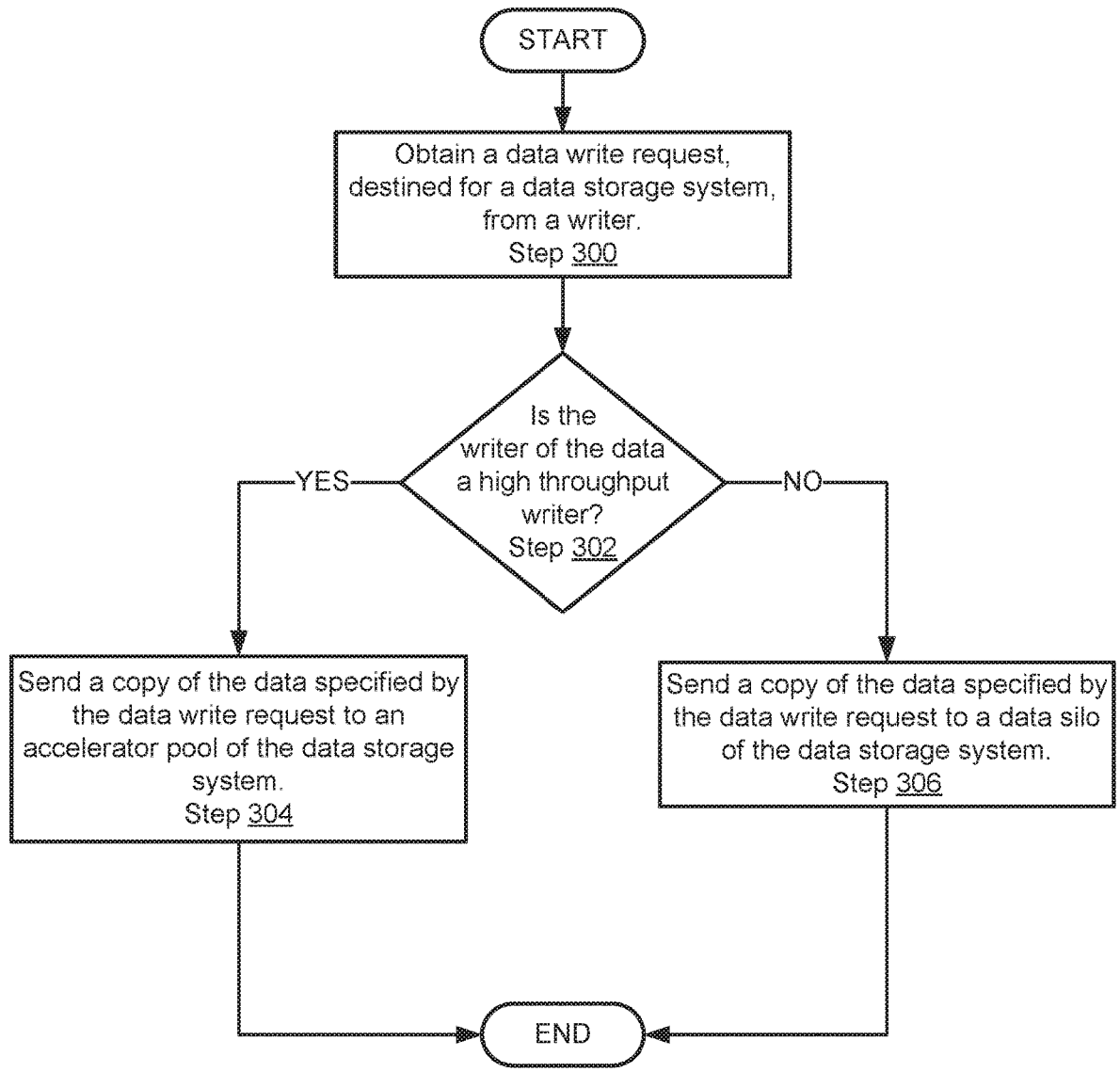
FIG. 3.1

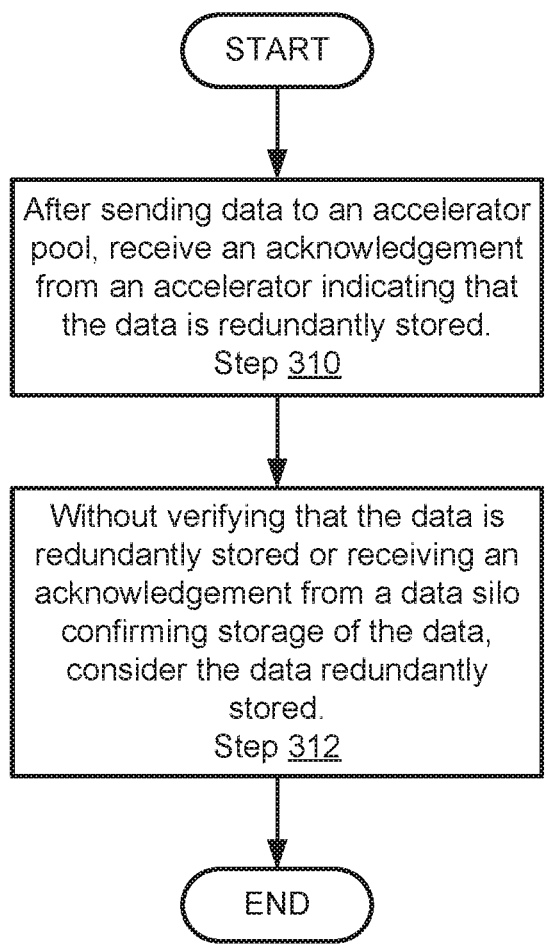
FIG. 3.2

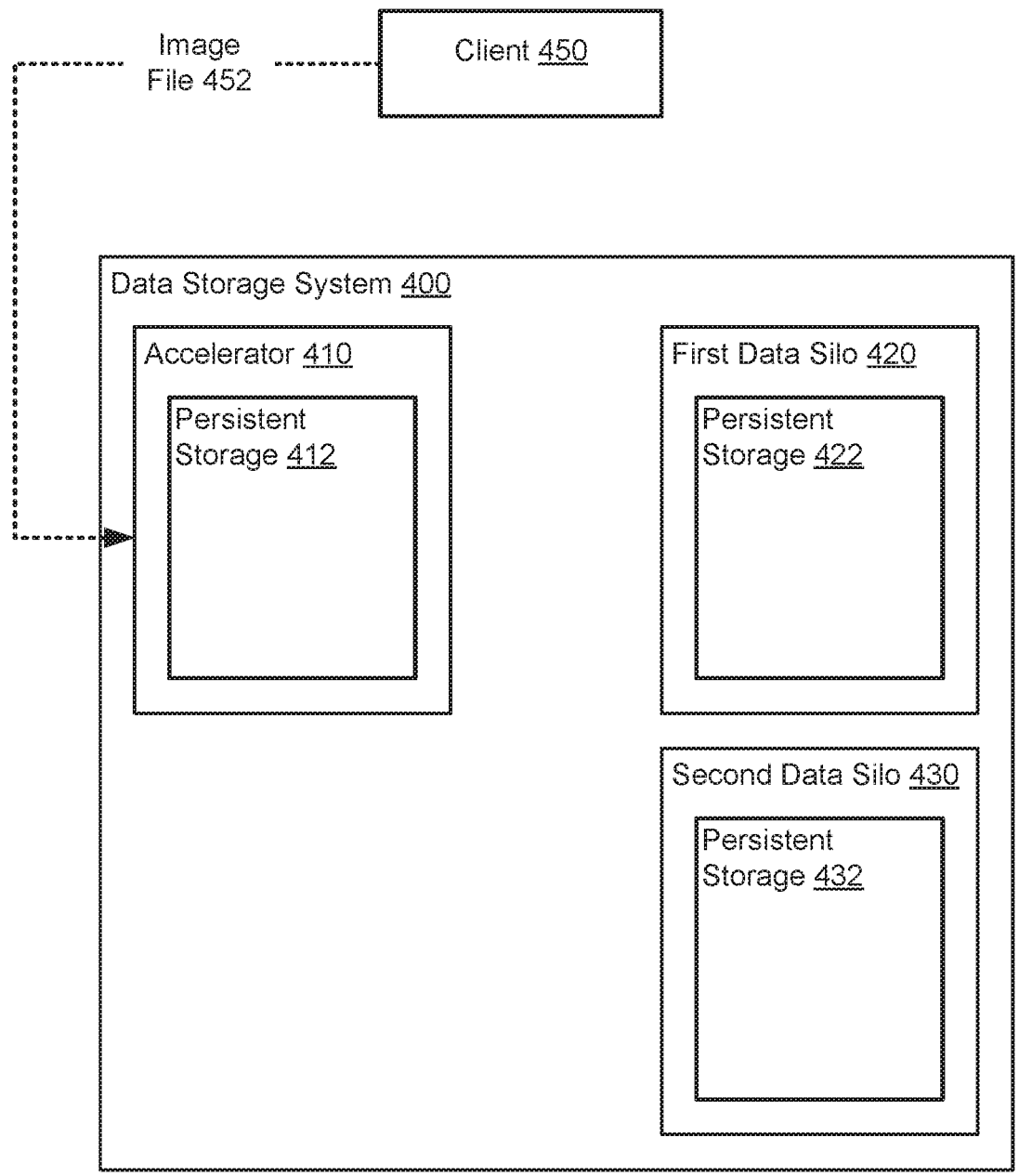
FIG. 4.1

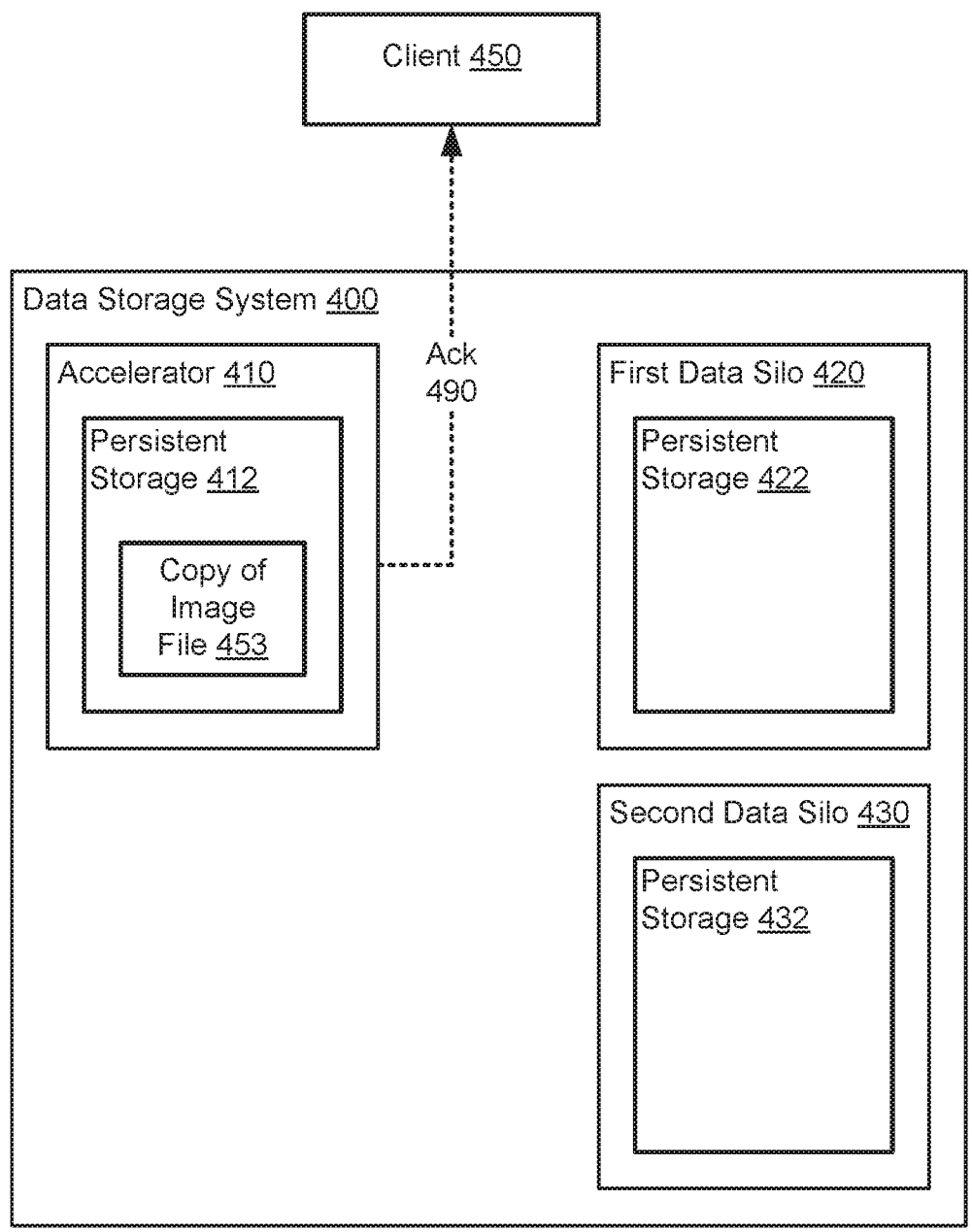
FIG. 4.2

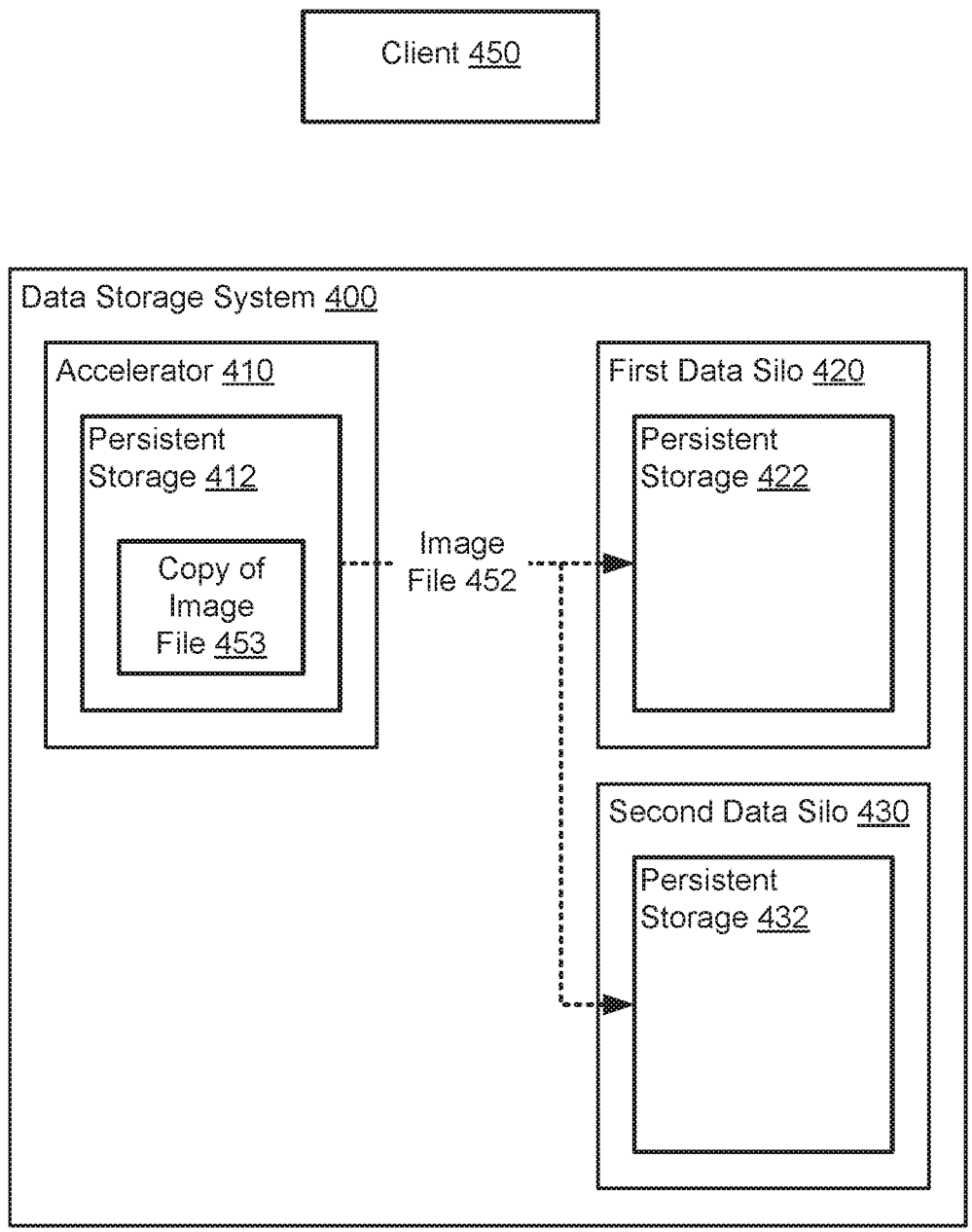
FIG. 4.3

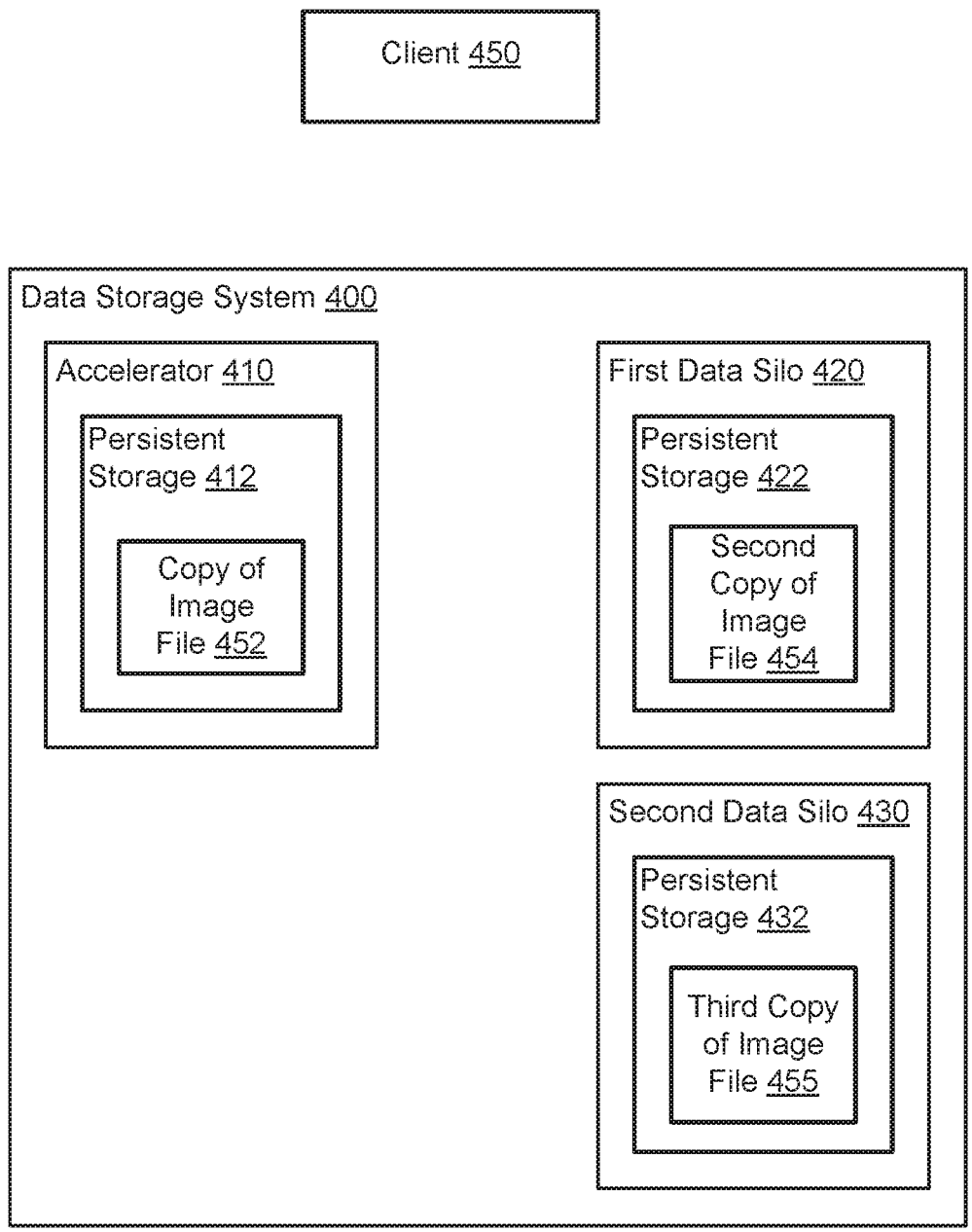
FIG. 4.4

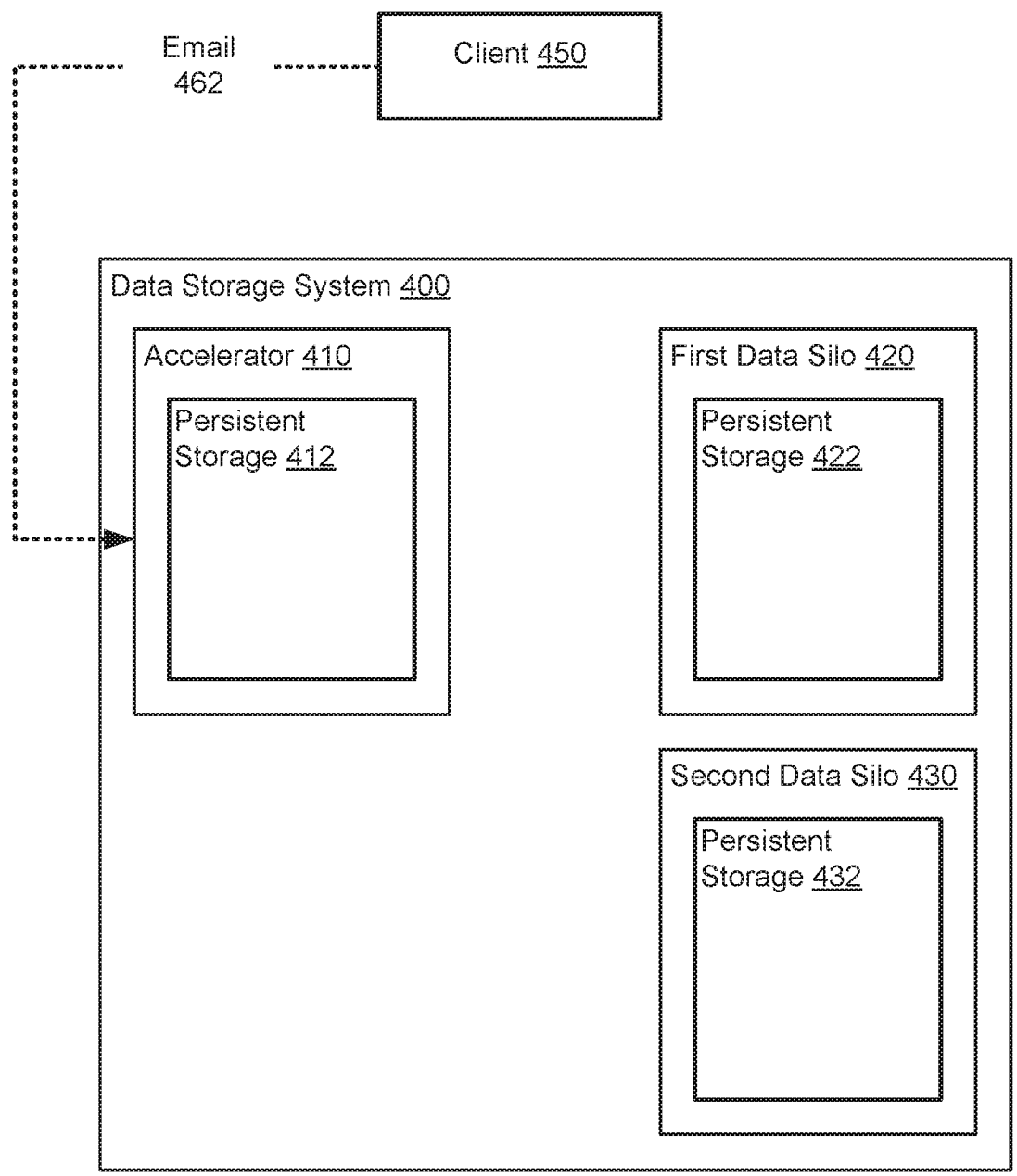
FIG. 4.5

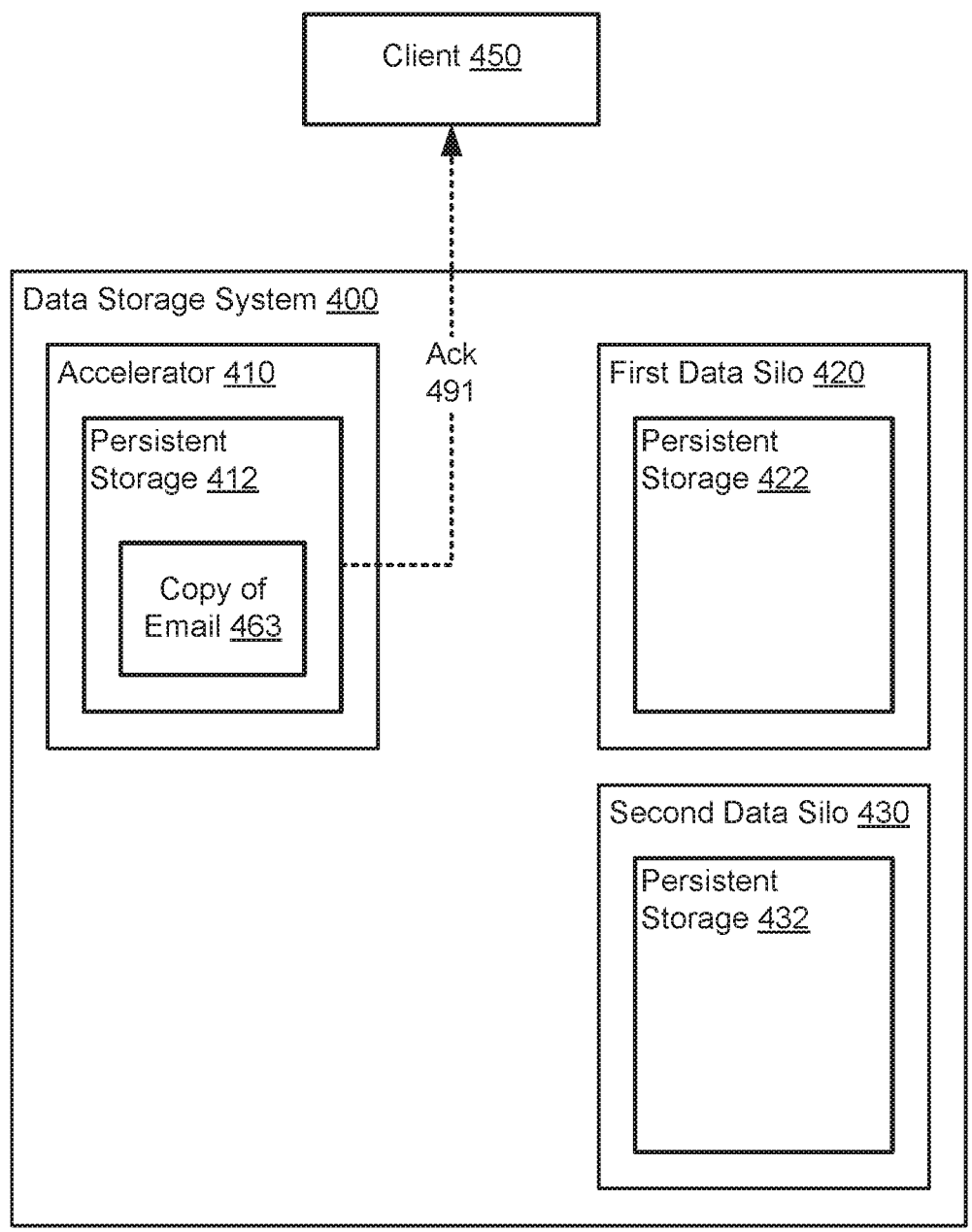
FIG. 4.6

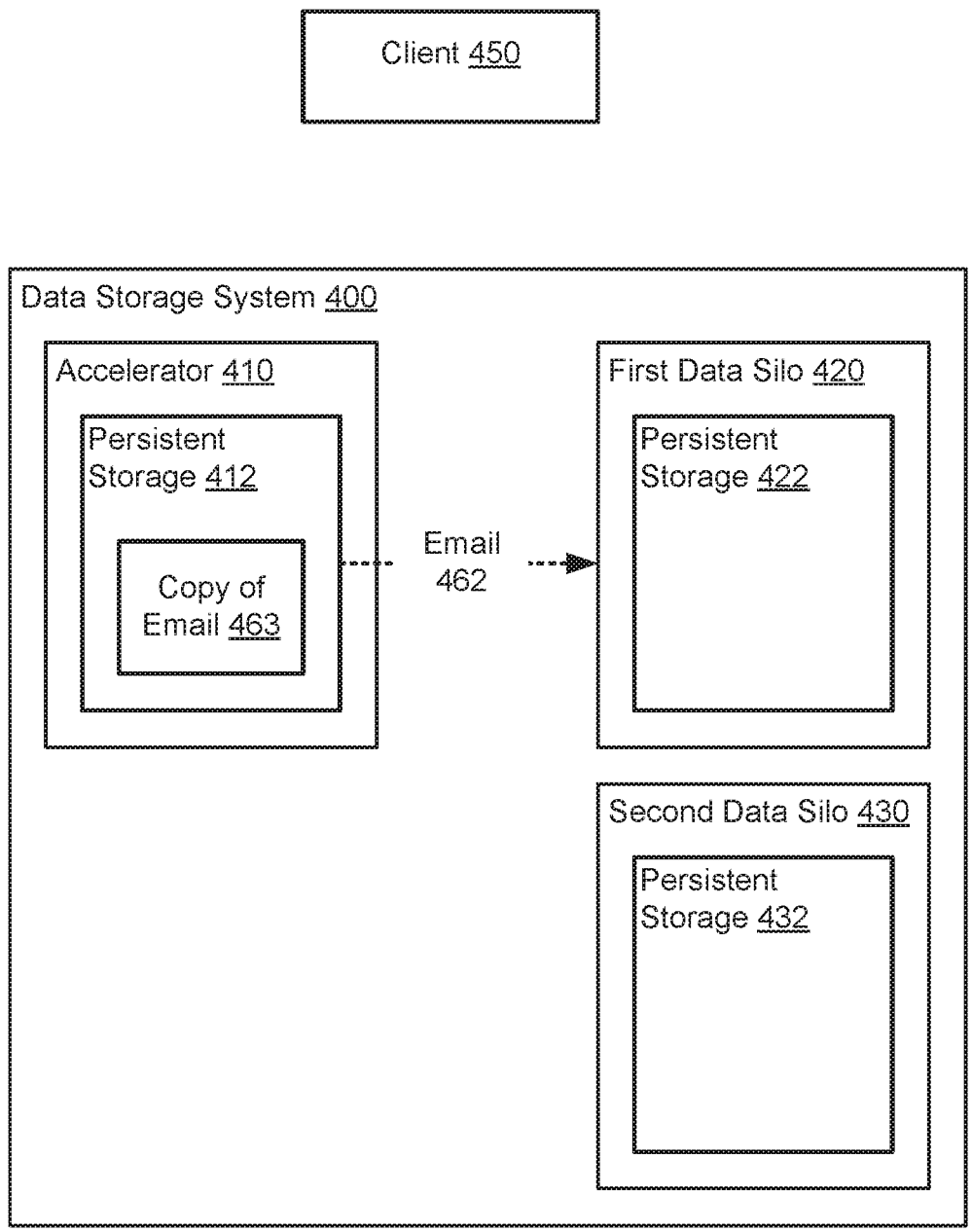
FIG. 4.7

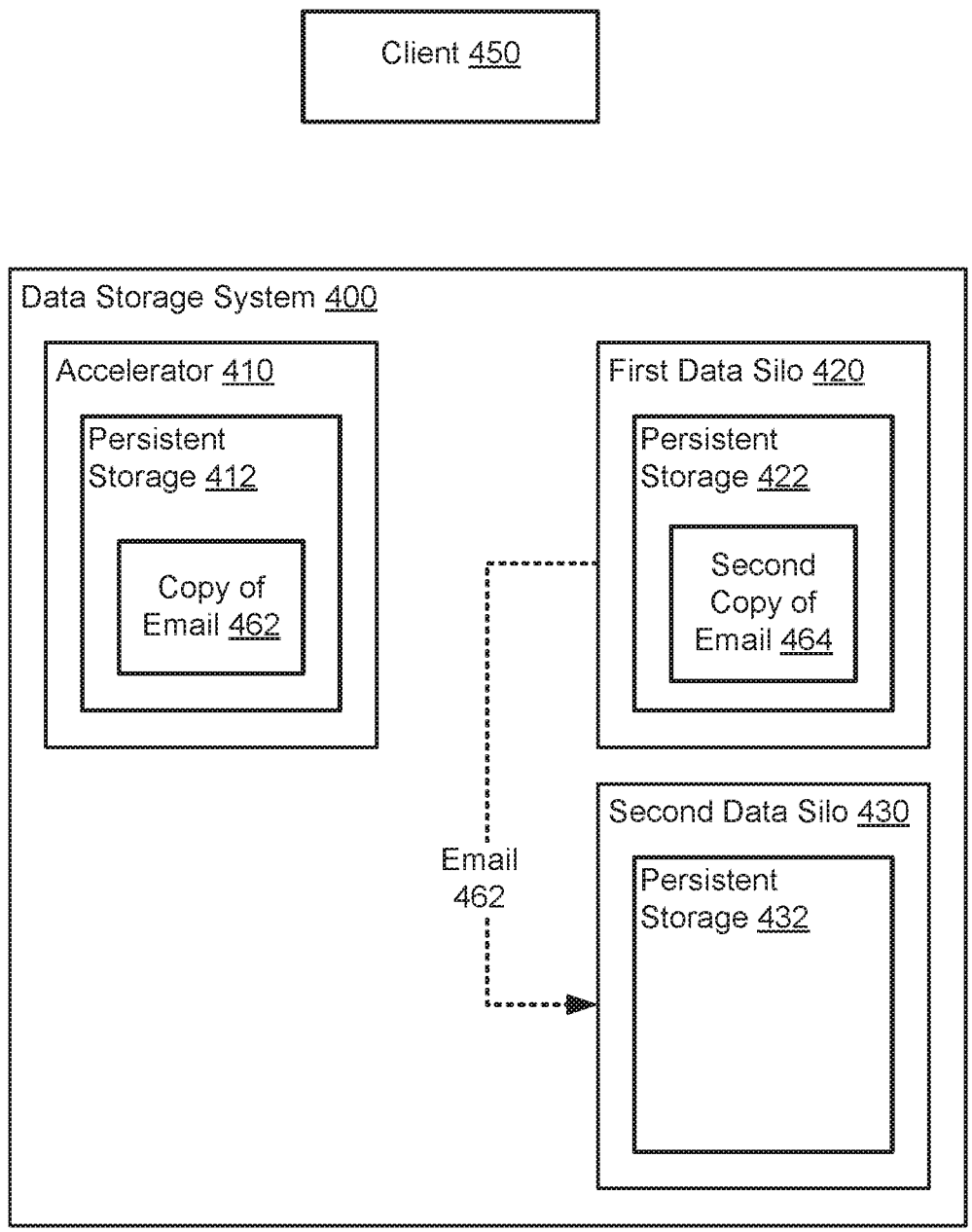
FIG. 4.8

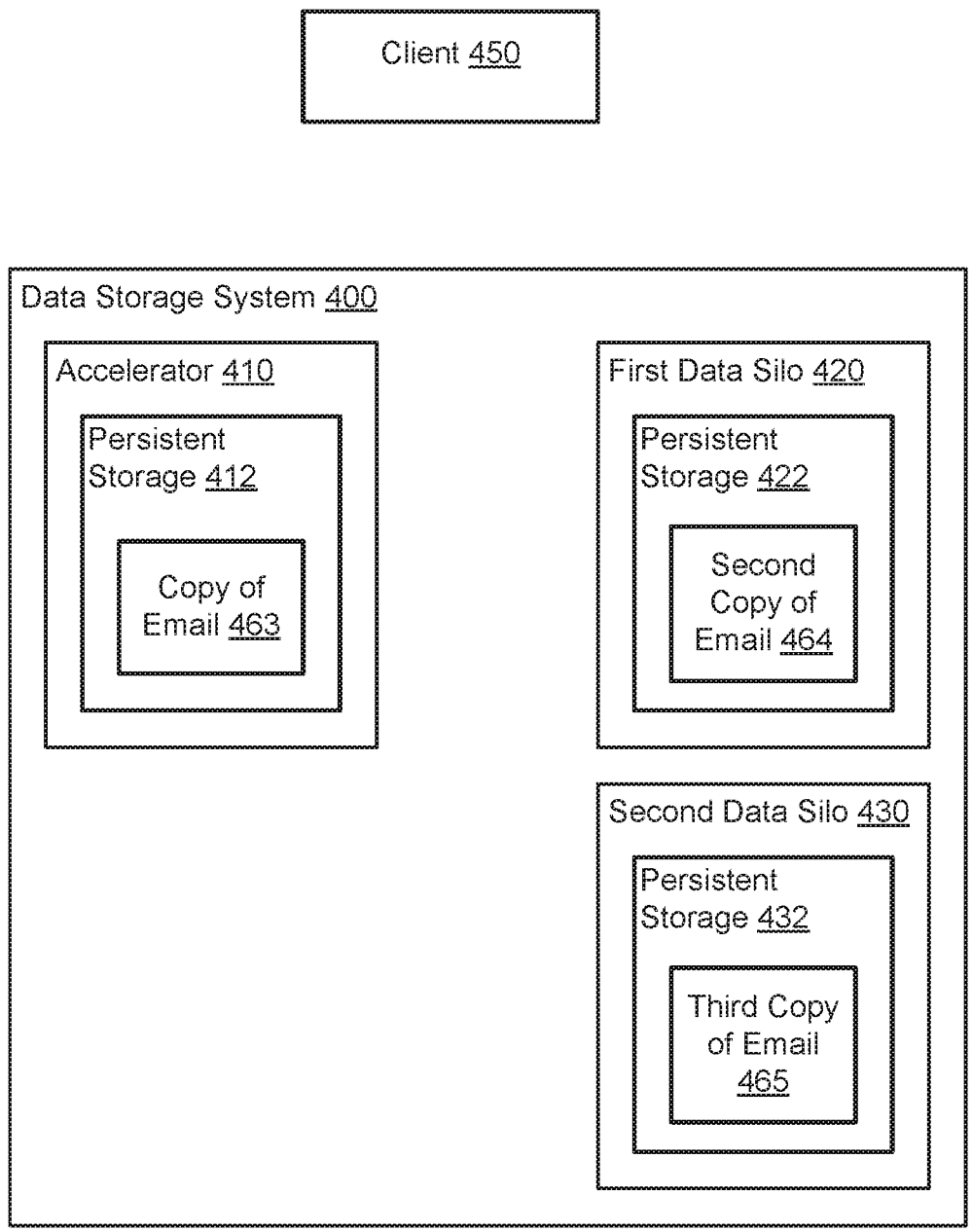
FIG. 4.9

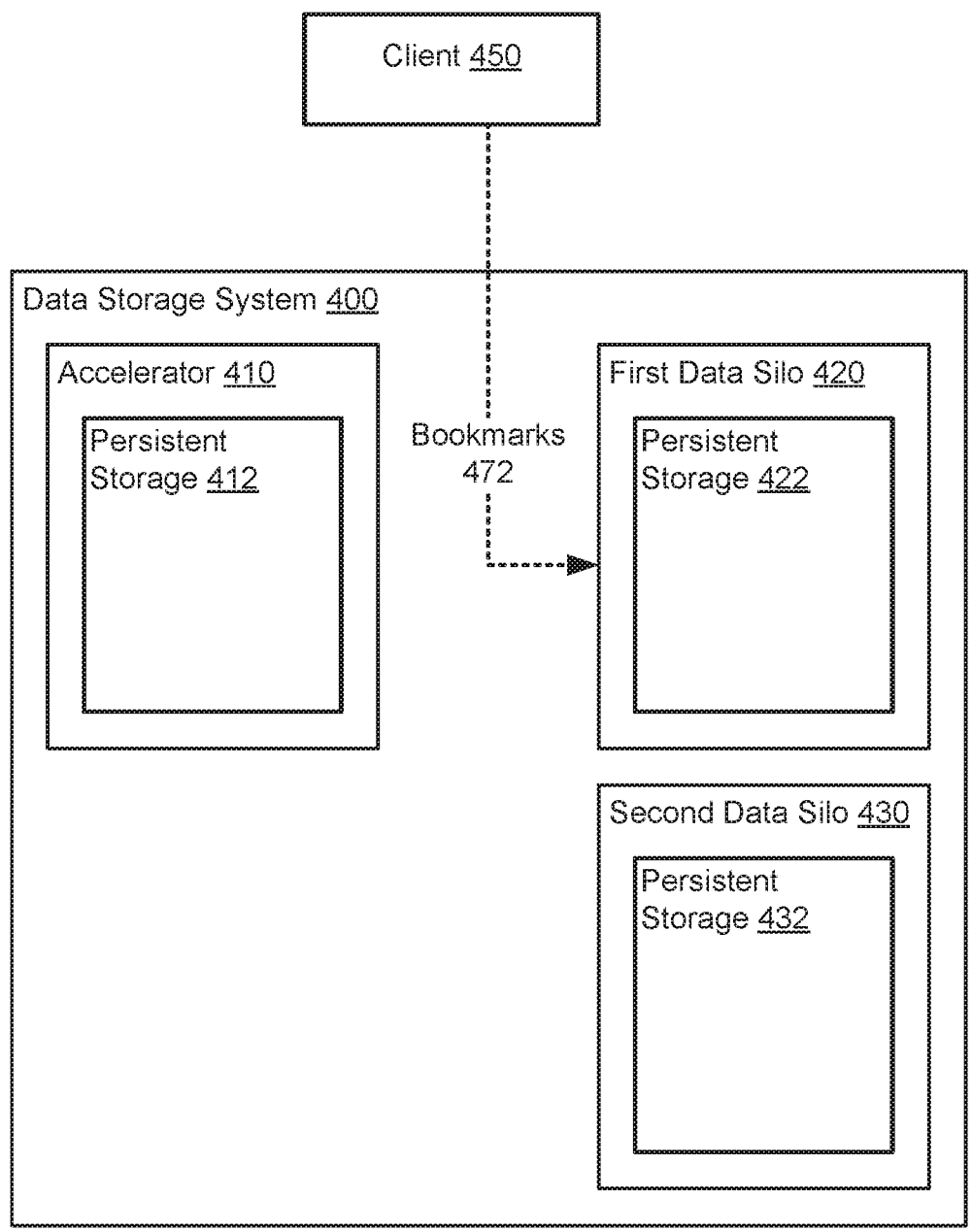
FIG. 4.10

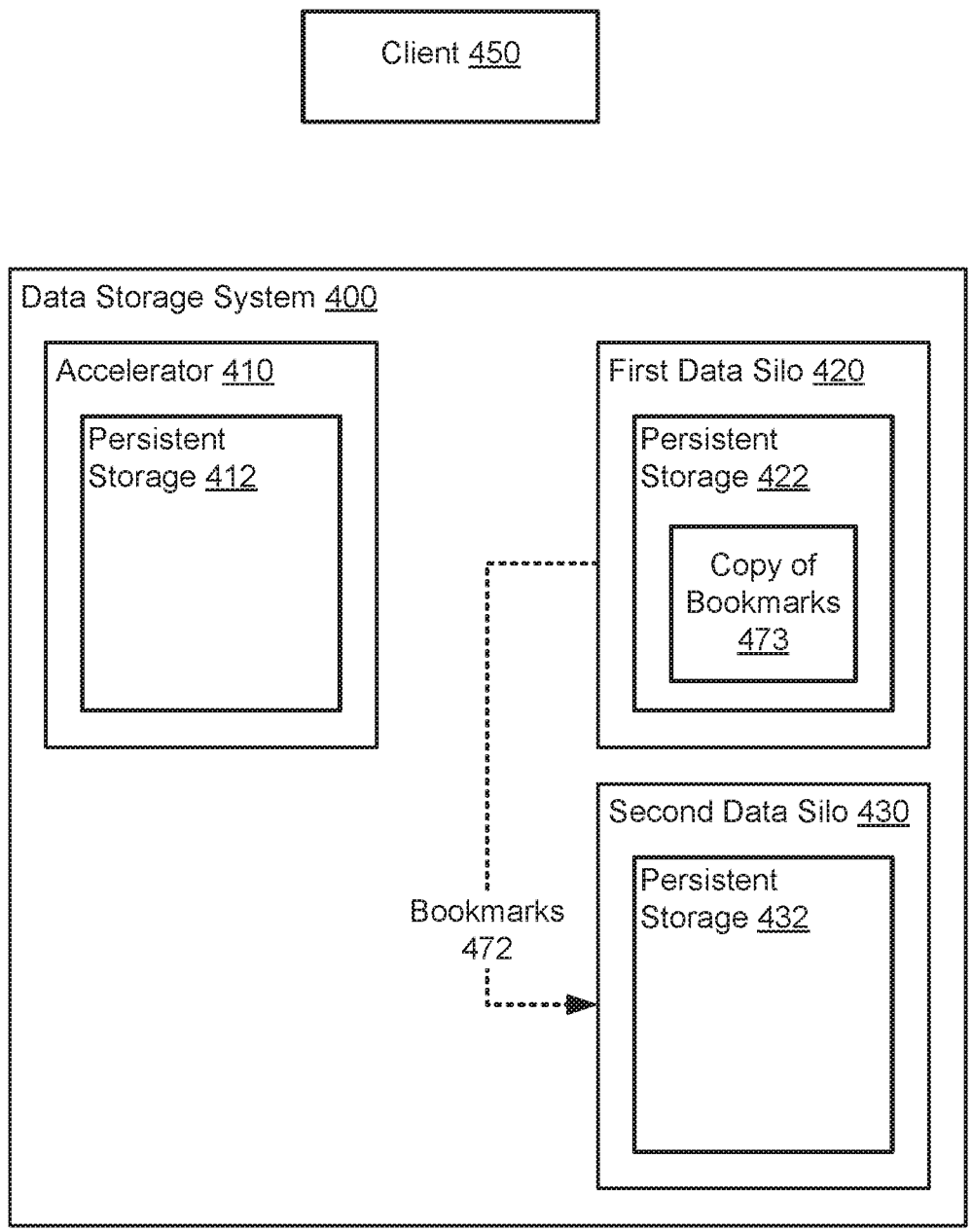
FIG. 4.11

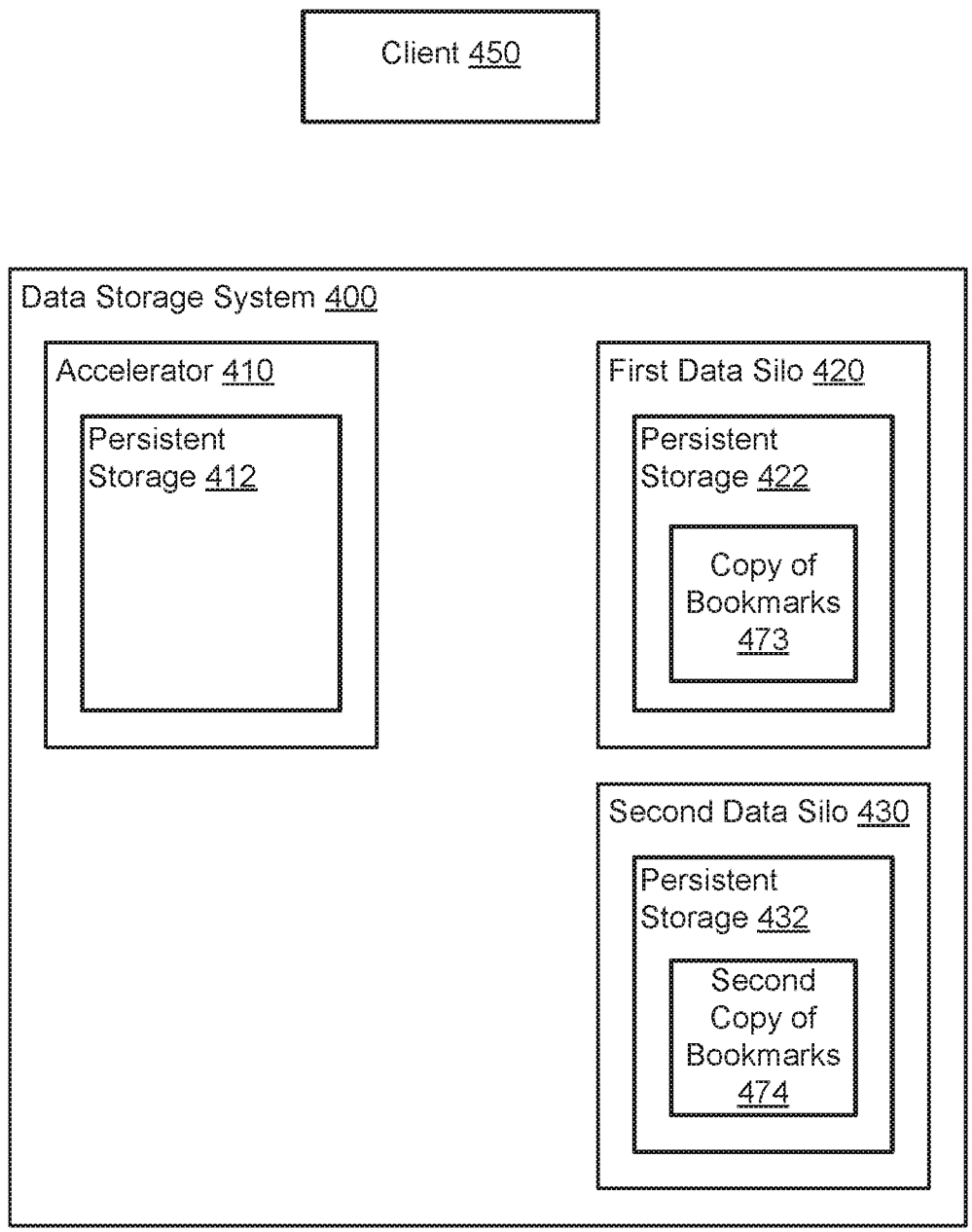
FIG. 4.12

SYSTEM AND METHOD FOR DATA STORAGE IN DISTRIBUTED SYSTEM ACROSS MULTIPLE FAULT DOMAINS

BACKGROUND

Computing devices may store information. For example, computing devices may include internal storage such as hard disk drives for storing information. The information may be stored in the form of computer files. The stored information may represent the state of applications hosted by the computing devices.

SUMMARY

In one aspect, a data storage system in accordance with one or more embodiments of the invention includes an accelerator pool and data silos. The accelerator pool obtains a data storage request for first data; stores a copy of the first data locally in a memory of the accelerator pool; in response to storing the copy of the first data: sends an acknowledgement to a requesting entity that generated the data storage request; and, after sending the acknowledgement, stores at least one second copy of the first data in the data silos. The acknowledgement indicates that the first data is redundantly stored in at least two different fault domains.

In one aspect, a method for storing data in a data storage system in accordance with one or more embodiments of the invention includes obtaining, by an accelerator pool, a data storage request for first data; storing a copy of the first data locally in a memory of the accelerator pool; in response to storing the copy of the first data: sending an acknowledgement to a requesting entity that generated the data storage request; and, after sending the acknowledgement, storing at least one second copy of the first data in data silos. The acknowledgement indicates that the first data is redundantly stored in at least two different fault domains.

In one aspect, a non-transitory computer readable medium in accordance with one or more embodiments of the invention includes computer readable program code, which when executed by a computer processor enables the computer processor to perform a method for storing data in a data storage system. The method includes obtaining, by an accelerator pool, a data storage request for first data; storing a copy of the first data locally in a memory of the accelerator pool; in response to storing the copy of the first data: sending an acknowledgement to a requesting entity that generated the data storage request; and, after sending the acknowledgement, storing at least one second copy of the first data in data silos. The acknowledgement indicates that the first data is redundantly stored in at least two different fault domains.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a data storage system in accordance with one or more embodiments of the invention.

FIG. 2.1 shows a flowchart of a method of storing data in a data storage system in accordance with one or more embodiments of the invention.

FIG. 2.2 shows a flowchart of a method for sending data to data silos in accordance with one or more embodiments of the invention.

FIG. 3.1 shows a flowchart of a method of sending data to a data storage system in accordance with one or more embodiments of the invention.

FIG. 3.2 shows a flowchart of a method of confirming that data is stored in a data storage system in accordance with one or more embodiments of the invention.

FIGS. 4.1-4.12 show diagrams of an example system at different points in time as data is stored within the example system.

DETAILED DESCRIPTION

Figure 5:
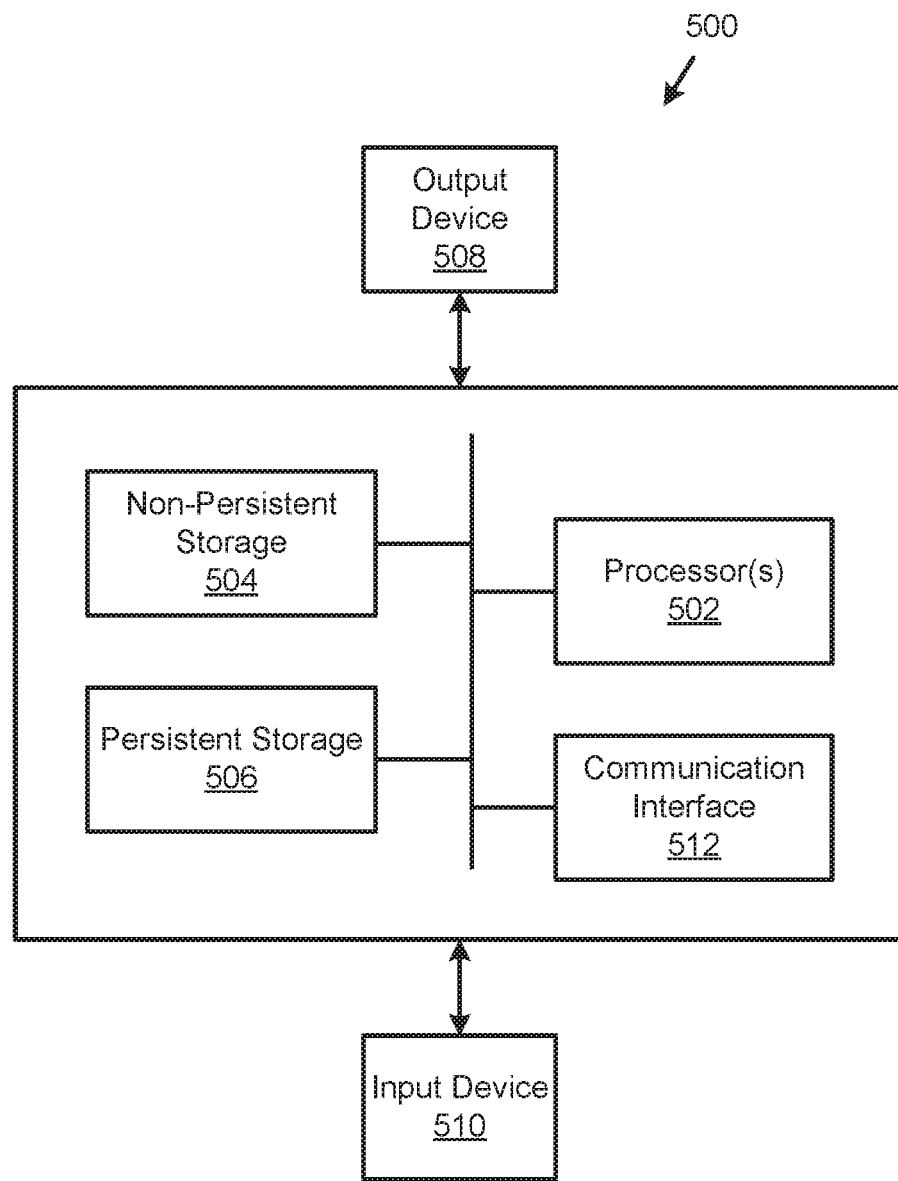
FIG. 5 shows a diagram of a computing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for storing data. A system in accordance with embodiments of the invention may be a data storage system. The data storage system may store multiple copies of data for data redundancy purposes. At least some of the copies of the data may be stored in different fault domains to improve the reliability of retrieving the data.

In one or more embodiments of the invention, the system may include an accelerator pool for providing high performance data storage services to clients. The accelerator pool may include any number of physical devices that are optimized for storing of client data. For example, the physical devices may include nonvolatile random-access memory or other high-performance memory devices. When client data is received by the physical device, the client data may be stored in the high-performance memory device. After storage of the client data in memory, the accelerator pool may send an acknowledgment that the client data has been stored after the client data is stored in the high-performance memory device. In one or more embodiments of the invention, the acknowledgment may indicate that the client data is redundantly stored in at least two locations while the client data has not, in fact, been stored redundantly in two locations at the time the acknowledgment is sent.

In one or more embodiments of the invention, the accelerator pool orchestrates storage of at least a second copy of the client data in a data silo after sending the acknowledgment. By doing so, embodiments of the invention may provide an ultra-high-performance data storage service to clients by sending acknowledgments of completion of redundantly storing the client data while the redundant storage of the client data is still being performed. In contrast, contemporary data storage systems may be unable to provide similar performance because of the duration of time required for actual redundant storage of multiple copies of client data. Thus, embodiments of the invention may improve data storage technology in distributed systems by reducing the latency of storing data in the data storage system from the perspective of the client.

In one or more embodiments of the invention, data silos are lower performance computing devices when compared to the accelerator pool. For example, the data silos may have slower interconnect speeds, lower memory bandwidth, and/or lower storage bandwidth (or other characteristics of the storage device such as IOPS (Input/Output Operations Per Second)).

In one or more embodiments of the invention, the data storage system may ration access to the accelerator pool. For example, the data storage system may only allow or otherwise authorized high data throughput users to have access to the accelerator pool. Other users may be relegated to only storing data via the data silos. In this manner, embodiments of the invention may provide a scalable system that does not require all computing devices of the distributed system to be of high performance.

In one or more embodiments of the invention, the data storage system may provide data redundancy by storing copies of data in different fault domains. For example, the accelerator pool may be in a first fault domain and the data silos may be in a second fault domain that is independent from the first fault domain.

FIG. 1.1 shows a diagram of an example system in accordance with one or more embodiments of the invention. The example system may include clients (100) that store data in and retrieve data from a data storage system (110). There may be any number of clients (e.g., 100A, 100N) that utilize the data storage services offered by the data storage system (110). The clients (100) may be connected to the data storage system (110) by any combination of wired and/or wireless networks. Each component of the system of shown in FIG. 1.1 is discussed below.

The clients (100) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or a portion, of the methods illustrated in FIGS. 2.1-3.2. The clients (100) may be other types of computing devices without departing from the invention. For additional details regarding computing devices, refer to FIG. 5.

In one or more embodiments of the invention, the clients (100) host applications (not shown). Each of the clients (e.g., 100A, 100N) may host any number of applications. For example, a first client may host a single application while a second client may host two applications. Each of the clients (100) may host similar or different applications.

In one or more embodiments of the invention, different applications hosted by the clients (100) have different data storage throughput requirements. For example, a database application may have a high data storage throughput requirement. In contrast, an instant messaging application may have a low data storage throughput requirement.

In one or more embodiments of the invention, the clients (100) may store application data in the data storage system (110). For example, the clients (100) may store a portion of an application's data, a copy of an application's data, and/or data associated with an application in the data storage system (110).

In one or more embodiments of the invention, the clients (100) may selectively use the functionality of the data storage system (110) to service the data storage needs of the applications hosted by the clients (100). As will be discussed in greater detail below, the data storage system (110) may have a limited capacity for high throughput data storage in comparison to the capacity of the data storage system (110) for low throughput data storage. The clients (100) may selectively assign applications to use either the high throughput data storage capacity or low throughput data storage capacity of the data storage system (110) depending on the data storage needs of the respective applications.

To perform the above noted functions of the clients (100), the clients (100) may include functionality to: (i) identify the data storage throughput requirements of applications, (ii) communicate with the data storage system (110), and (iii) both store and retrieve data via the data storage system (110). The clients (100) may include additional functionality without departing from the invention.

The data storage system (110) may be a distributed system that includes any number of computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or a portion, of the methods illustrated in FIGS. 2.1-3.2. The data storage system (110) may include other types of computing devices without departing from the invention. For additional details regarding computing devices, refer to FIG. 5.

The data storage system (110) may utilize virtualized resources of any number of computing devices. For example, the data storage system (110) may be a virtualized entity executing using computing resources of any number of computing devices. The computing resources may be, for example, processor cycles, memory capacity, storage capacity, and/or communication capacity. The computing resources may be other types of resources without departing from the invention.

In one or more embodiments of the invention, the data storage system (110) provides data storage services to the clients (100). For example, the data storage system (110) may receive data from the clients (100) and store the received data for future retrieval by the clients (100), or other entities.

In one or more embodiments of the invention, the data storage system (110) provides at least two classes of data storage services to the clients (100). The first class of service is a high throughput service. The high throughput service allows the clients (100) to store some data at high storage rates in the data storage system (110) with little latency. The second class of service is a low throughput service. The low throughput service allows the clients (100) to store large quantities of data at lower storage rates than the storage service rate provided by the high throughput service.

In one or more embodiments of the invention, the data storage system (110) has a limited quantity of high throughput data storage service to provide to the clients (100) when compared to the quantity of low throughput data storage service of the data storage system (110). For example, the data storage system (110) may only be able to provide high throughput data storage service to one client for every ten clients that the data storage system (110) is able to provide low throughput data storage service. For additional details regarding the data storage system (110), refer to FIG. 1.2.

While the system of FIG. 1.1 has been illustrated as only including clients (100) and a data storage system (110), embodiments of the invention may include additional elements without departing from the invention. For example, the system of FIG. 1.1 may include other command-and-control devices, network management equipment, and/or other storages such as long-term storage.

FIG. 1.2 shows a diagram of the data storage system (110) in accordance with one or more embodiments of the invention. As discussed with respect to FIG. 1.1, the data storage system (110) may provide data storage services to clients, or other entities. To provide the aforementioned functionality, the data storage system (110) may include an accelerator pool (120) and one or more data silos (130). The accelerator pool (120) and the data silos (130) may work cooperatively to redundantly store data from clients, or other entities. Each component of the data storage system (110) is discussed below.

In one or more embodiments of the invention, the accelerator pool (120) provides high throughput data storage services to the clients. The accelerator pool (120) may include any number of accelerators (e.g., 120A, 120N) that each provide data storage services to clients.

In one or more embodiments of the invention, the accelerators are physical devices. The physical devices may be computing devices. The computing devices may be, for example, servers, personal computers, laptops, embedded computing devices, or any other type of programmable computing device. The physical devices may include circuitry. In one or more embodiments of the invention, the computing devices include one or more processors, memory, storages, and/or network interfaces. The processors may be, for example, central processor units, embedded processors, digital signal processors, application-specific integrated circuits, multicore processors, or any other type of digital processor. The memory may be, for example, random access memory. The storage may be, for example, persistent storage such as any combination of hard disk drives, solid-state drives, tape drives, and any other type of non-transitory computer readable storage medium.

In one or more embodiments of the invention, the accelerators include non-volatile memory. For example, the non-volatile memory may be non-volatile dual in-line solid state memory modules. By including non-volatile memory storing data in memory may be less risky than storing data in volatile memory.

In one or more embodiments of the invention, a persistent storage of the accelerators includes instructions which when executed by a processor of the accelerators causes the accelerators to provide the functionality of the accelerators described throughout this application. Executing the instructions stored in the persistent storage of the accelerators may cause the accelerators to perform all, or a portion, of the methods illustrated in FIGS. 2.1-3.2.

To provide high throughput data storage services to the clients, the accelerator pool (120) may be programmed to: (i) store data received from the clients in memory upon receipt of the data, (ii) send an acknowledgment to the clients after storing the data in memory, (iii) store one or more copies of the data in the data silos (130) after sending the acknowledgment to the clients, and/or (iv) migrate the stored data from memory to storage. In this manner, embodiments of the invention may provide an ultra-high throughput data storage service to the clients.

In one or more embodiments of the invention, the acknowledgment indicates that the data has been redundantly stored. Data may be redundantly stored if at least a first copy of the data is stored in a first fault domain and a second copy of the data is stored in a second fault domain that is independent from the first fault domain.

As used herein, a fault domain refers to a portion of a network that is negatively affected when a critical device or network service experiences a problem. Independent fault domains may not include the same critical device or network service. Thus, when a critical device or service of a fault domain experiences a problem, only the fault domain is affected by the problem. Other, independent, fault domains do not experience the problem caused by failure of a critical service or device. For example, a first fault domain may include a router that provides networking services to a first group of computing devices. A second fault main may include a second router that provides networking services to a second group of computing devices. Because each group of computing devices does not utilize the same router, a problem experienced by the first router will not likely impact the second group of computing devices nor will a second problem experienced by the second router be likely to impact the first group of computing devices.

In one or more embodiments of the invention, the accelerator pool (120) and the data silos (130) are in separate fault domains. Thus, storing a copy of data in the accelerator pool and a second copy of the data in the data silos results in the data being stored redundantly.

In one or more embodiments of the invention, the accelerator pool (120) includes functionality to directly write copies of data to memory of the data silos (130). For example, the accelerator pool (120) may include functionality for remote direct memory access (RDMA) of the memory of the data silos (130). In such a scenario, the accelerator pool (120) may be able to bypass the data buffers and operating system to write copies of data directly to the memory of the data silos (130). For example, the accelerator pool (120) may support zero-copy networking to write copies of data directly to the memory of the data silos (130). By doing so, a network adapter of the data silos (130) may receive a copy of the data from the accelerator pool (120) and store it directly into memory of the data silos (130) without utilizing processing resources, caches, and not requiring context switches. In other words, storing copies of data in memory of the data silos (130) may be done in parallel with other system operations of the data silos (130) without impairing the functionality of the data silos (130).

In one or more embodiments of the invention, the accelerator pool (120) includes functionality to migrate copies of stored data from storage to memory. For example, in some cases the clients may frequently request access to previously stored data. In such a scenario, the accelerator pool (120)

may keep track of the frequency by which clients access stored copies of data. Stored copies of data that are accessed frequently may be migrated from storage to memory. By doing so, the availability of the frequently accessed stored data may be improved. For example, latency for retrieving data from memory may be substantially less in retrieving the data from storage. In this manner, the accelerator pool (120) may also provide intelligent caching services for stored data from the clients.

In one or more embodiments of the invention, the accelerator pool (120) is connected to the data silos (130) by any combination of wired and/or wireless networks. The accelerators of the accelerator pool (120) may similarly be interconnected to each other through any combination of wired and/or wireless networks.

In one or more embodiments of the invention, the data silos (130) provide low throughput data storage services to the clients. The data silos (130) may provide low throughput data storage services to the clients by: (i) storing copies of data under the direction of the accelerator pool (120) or (ii) storing copies of data directly received from the clients. If data is received directly from the clients, the data silos (130) may store the data without interacting with the accelerator pool (120).

The data silos (130) may include any number of silos (e.g., 132, 134). Each of the any number of silos may be in independent fault domains. For example, silo A (132) may be in a first fault domain that is independent from the second fault domain in which silo B (134) resides.

Each of the silos (132, 134) may include any number of storage devices. A storage device (e.g., 132A, 132N, 134A, 134N) may include functionality to store data.

In one or more embodiments of the invention, the storage devices are physical devices. The storage devices may be computing devices. The computing devices may be, for example, servers, personal computers, laptops, embedded computing devices, or any other type of programmable computing device. The physical devices may include circuitry. In one or more embodiments of the invention, the computing devices include one or more processors, memory, storages, and/or network interfaces. The processors may be, for example, central processor units, embedded processors, digital signal processors, application-specific integrated circuits, multicore processors, or any other type of digital processor. The memory may be, for example, random access memory. The storage may be, for example, persistent storage such as any combination of hard disk drives, solid-state drives, tape drives, and any other type of non-transitory computer readable storage medium.

In one or more embodiments of the invention, a persistent storage of the storage devices includes instructions which when executed by a processor of the storage devices causes the storage devices to provide the functionality of the storage devices described throughout this application. Executing the instructions stored in the persistent storage of the storage devices may cause the storage devices to perform all, or a portion, of the methods illustrated in FIGS. 2.1-3.2.

In one or more embodiments of the invention, the silos (132, 134) may operate as a distributed system. In other words, each of the storage devices of each silo may be programmed to cooperatively provide the functionality of the silos described throughout this application. Similarly, the silos (132, 134) may operate as a distributed system that cooperatively provides the functionality of the data silos (130).

To provide low throughput data storage services to the clients, the data silos (130) may be programmed to: (i) obtain a copy of data for storage from either in accelerator pool or client and (ii) redundantly store a copy of the data in the data silos. To redundantly store the copy of the data in the data silos, two copies may be stored in separate silos. As noted above, each silo (e.g., 132, 134) may be in independent fault domains. Thus, by storing two copies of the data into silos, the data may be redundantly stored.

In one or more embodiments of the invention, the accelerator pool (120) includes functionality for other entities to directly write copies of data to memory of the data silos (130). For example, the data silos (130) may support RDMA of the memory of the data silos (130). In such a scenario, the accelerator pool (120) may be able to bypass the data buffers and/or operating system of the data silos (130) to write copies of data directly to the memory of the data silos (130). In such a scenario, the data silos (130) may monitor RDMA writing of memory. To ensure redundancy of stored data, the data silos (130) may be programmed to automatically store a second copy of the stored data in another silo after the data silos (130) identify a RDMA write.

While, for the sake of brevity, the accelerator pool (120) and the data silos (130) have been described as including a limited number of components, these elements individually and as the data storage system (110) may include additional components without departing from the invention.

As discussed above, a data storage system may provide high throughput data storage services to clients. FIGS. 2.1-2.2 show methods in accordance with one or more embodiments of the invention that may be performed by components of the system of FIG. 1.1.

FIG. 2.1 shows a flowchart of a method in accordance with one or more embodiments of the invention. The method depicted in FIG. 2.1 may be used to provide high throughput data storage services to clients in accordance with one or more embodiments of the invention. The method shown in FIG. 2.1 may be performed by, for example, a data storage system (e.g., 110, FIG. 1.1). Other components of the system illustrated in FIG. 1.1 may perform the method of FIG. 2.1 without departing from the invention.

In step 200, data is obtained from a client.

In one or more embodiments of the invention, the data is obtained by an accelerator pool of a data storage system. The data may be, for example, a copy of the database or other data structure. The data may be other types of data without departing from the invention.

In one or more embodiments of the invention, the data is obtained by receiving the data from the client, or an intermediary entity. For example, the client may send the data to the accelerator pool for storage in the data storage system.

In step 202, a copy of the data is stored in local memory.

In one or more embodiments of the invention, the local memory is nonvolatile random access memory.

In one or more embodiments of the invention, the local memory is volatile random access memory.

In one or more embodiments of the invention, the copy of the data is stored in the local memory without storing a copy of the data in a storage of the accelerator pool. The copy of the data may be migrated to storage at a later point in time after storing the copy of the data in the local memory.

In one or more embodiments of the invention, the accelerator pool may assign an accelerator for providing storage services to the client to balance client load across the accelerators of the accelerator pool. In such a scenario, the accelerator that obtained the data may not provide data storage services to the client. Rather, a second accelerator that did not obtain the data may be assigned to provide data storage services to the client. The second accelerator, rather than the accelerator that obtained the data, may store the copy of the data in the local memory of the second accelerator.

In step 204, an acknowledgment is sent to the client.

In one or more embodiments of the invention, the acknowledgment indicates that the data is stored. The acknowledgment may indicate that the data is redundantly stored. The data may not be redundantly stored at the time the acknowledgment is sent by the accelerator pool.

In one or more embodiments of the invention, the acknowledgment may include a data storage system reference for the data. The data storage system reference may be used by the client to retrieve a copy of the data from the data storage system. Once a data storage system reference is assigned to the data, all components of the data storage system may use the data storage system reference for identification purposes, or other purposes, for the data. The data storage system reference may be, for example, a uniform resource indicator or other type of reference that uniquely, or non-uniquely, identifies the data within the data storage system.

In step 206, after storing the data in the local storage, a second copy of the data is sent to data silos.

In one or more embodiments of the invention, the accelerator pool and the data silos are portions of the same data storage system. For example, as described with respect to FIG. 1.2, the accelerator pool may include a first group of computing devices that provide high throughput data storage services and the data silos may include a second group of computing devices that provide low throughput data storage services. The references high and low designate the rate of data storage services provided by the accelerator pool and the data silos with respect to each other, but not with respect to other entities that may provide data storage services.

In one or more embodiments of the invention, the second copy of the data is sent to the data silos as a network write. For example, the network write may be a RDMA write to a memory of the data silos. By doing so, embodiments of the invention may bypass the operating system and other control plane components of the data silos. Other types of network writes or methods of storing data in a distributed system may be used to store a second copy of the data in the data silos without departing from the invention.

In one or more embodiments of the invention, the second copy of the data is sent to the data silos after the acknowledgment is sent to the client. By doing so, embodiments of the invention may provide a lower latency of data storage from the perspective of the client when compared to the latency that may be provided in a scenario in which acknowledgment is only sent after at least a second copy of the data is stored in a data silo, or another entity in a separate fault domain from the fault domain in which the accelerator pool resides.

In one or more embodiments of the invention, the second copy of the data is sent to the data silos via the method shown in FIG. 2.2. The second copy of the data may be sent to the data silos via other methods without departing from the invention.

In step 208, the copy of the data from the local memory is migrated to a storage.

In one or more embodiments of the invention, the local storage is a storage of the accelerator pool. For example, in a scenario in which the data is received by an accelerator and the copy of the data is stored in a memory of the accelerator, the copy of the data may be migrated to a storage of the accelerator. The storage may be of other accelerators in an accelerator pool without departing from the invention. Thus, in some embodiments of the invention, a copy of the data is stored in local storage of a first accelerator of the accelerator pool and a second copy of the data is stored in a memory of a second accelerator of the accelerator pool while migrating the copy of the data.

In one or more embodiments of the invention, migrating the copy of the data includes storing a copy in the storage and deleting the copy from the local memory. In some embodiments of the invention, the copy is not deleted from the local memory.

In one or more embodiments of the invention, local memory means a physical device that provides memory services to an accelerator. The local memory may be hosted by the accelerator. For example, the physical device may be a nonvolatile memory module disposed in a motherboard of the accelerator. The physical device may be other types of hardware devices that provide memory services without departing from the invention.

In one or more embodiments of the invention, local memory means virtualized memory assigned to an accelerator. The virtualized memory may utilize resources of any number of computing devices to provide memory services to the accelerator.

In one or more embodiments of the invention, local storage means a physical device that provides storage services to an accelerator. The local storage may be hosted by the accelerator. For example, the physical device may be a solid state disk drive operably connected to a motherboard of the accelerator. The physical device may be other types of hardware devices that provide storage services without departing from the invention.

In one or more embodiments of the invention, local storage means virtualized storage assigned to an accelerator. The virtualized storage may utilize resources of any number of computing devices to provide storage services to the accelerator.

In one or more embodiments of the invention, the storage is a local storage of a data silo. For example, the copy of the data may be migrated from the local memory of an accelerator to a local storage of the data silos. In such a scenario, the accelerator pool may monitor the utilization rate, e.g., access rate of the stored copy of the data, of the copy of the data and, if the utilization rate is below a predetermined threshold, may migrate the copy of the data to the storage of the data silo rather than a storage of the accelerator pool. If the utilization rate of the copy of the data changes, the accelerator pool may migrate the copy of the data from the local storage of the data silos to a local storage of the accelerator pool.

The method may end following step 208.

FIG. 2.2 shows a flowchart of a method in accordance with one or more embodiments of the invention. The method depicted in FIG. 2.2 may be used to send a copy of data to the data silos in accordance with one or more embodiments of the invention. The method shown in FIG. 2.2 may be performed by, for example, a data storage system (e.g., 110, FIG. 1.1). Other components of the system illustrated in FIG. 1.1 may perform the method of FIG. 2.2 without departing from the invention.

In step 210, it is determined whether the data received from the client is of high importance.

In one or more embodiments of the invention, high importance means that loss of the data may impair the ability of the client from which the data was obtained to perform its function such as, for example, providing database services, serving webpages, or any other type of computer implemented service.

In one or more embodiments of the invention, the importance of the data is determined based on a type of the data. For example, clients may provide a listing of different data types and the relative importance of each of these data types. Data having an importance that exceeds a predetermined threshold may be considered of high importance. Data having an importance below the predetermined threshold may be considered of low importance. If a client does not provide a listing of the importance of different data types, the accelerator pool may apply a default rule for making the determination regarding whether the data is of high importance. For example, the default rule may be that all data is of high importance. Or, the default rule may be that all data is of low importance. Other types of default rules may be used without departing from the invention. The importance of the data may be determined using other methods without departing from the invention.

If the data is of high importance, the method may proceed to step 214. If the data is not of high importance, the method may proceed to step 212.

In step 212, the second copy of the data is sent to a first data silo for sequential storage in the first data silo and a second data silo.

In one or more embodiments of the invention, the second copy of the data is only sent to the first data silo by the accelerator pool. In other words, the accelerator pool may only perform a single data transfer action when sequentially storing the second copy of the data in the data silos.

In one or more embodiments of the invention, the first data silo sends a copy of the second copy of the data to a second data silo for storage. The copy of the second copy of the data may be sent while the first data silo is storing the copy in the first data silo or after the first data silo stores the copy in the first data silo. By doing so, at least three copies of the data may be stored across three separate fault domains. As noted above, the accelerator pool and each of the data silos may be in independent fault domains.

By sequentially storing copies of the data in the first data silo and second data silo, respectively, the process of storing the copies of the data may be more time-consuming than if the copies were stored in the first and second data silo in parallel. However, by doing so, fewer resources of the accelerator pool may be utilized or redundant storage of the data in the data silos.

The method may end following step 212.

Returning to step 210, the method may proceed to step 214 if the data is of high importance.

In step 214, the second copy of the data is sent to both of a first data silo and a second data silo for parallel storage. In other words, the accelerator pool may send copies of the data to two data silos. By doing so, the data may be stored in both of the data silos more quickly than if the data was stored sequentially in the data silos. However, doing so may utilize more computing resources of the accelerator pool.

The method may end following step 214.

While step 210 has been described as making the determination for either sequential storage or parallel storage of the data in data silos based on an importance of the data, other factors or rules may be used to make the decision in step 210 without departing from the invention. For example, a default rule for either sequential or parallel storage may be used. In another example, the determination may be made based on an identity of the client. In such a scenario, certain clients may require sequential storage of data while other clients may require parallel storage of data. In additional examples, the determination may be made based on the load of the accelerator pool. In this scenario, the accelerator pool may elect to either sequentially store or store in parallel data in data silos based on the available computing resources of the accelerator pool at the time of storing the data in the data silos.

As noted above, a data storage system in accordance with embodiments of the invention may provide different qualities of data storage services. The qualities may either be high throughput or low throughput. FIGS. 3.1-3.2 show methods in accordance with one or more embodiments of the invention that may be performed by components of the system of FIG. 1.1 to manage provisioning of different qualities, e.g., classes, of storage services.

FIG. 3.1 shows a flowchart of a method in accordance with one or more embodiments of the invention. The method depicted in FIG. 3.1 may be used to provision data storage services from a data storage system in accordance with one or more embodiments of the invention. The method shown in FIG. 3.1 may be performed by, for example, clients (e.g., 100, FIG. 1.1). Other components of the system illustrated in FIG. 1.1 may perform the method of FIG. 3.1 without departing from the invention.

In step 300, a data write request destined for a data storage system is obtained from a writer.

In one or more embodiments of the invention, the writer is an application hosted by a client. For example, the writer may be a database application, a webpage server, an email server backend, or any other type of application.

In step 302, it is determined whether the writer of the data is a high throughput writer.

To make the determination of step 302, an identity of the writer may be matched to a list of writers that are known high rate writers. The list may be provided by a user of the client. The list may be obtained via other methods without departing from the invention. If the identity of the writer matches any writer specified by the list, the writer may be considered a high throughput writer. The writer of the data may be determined to be a high throughput writer via other methods without departing from the invention.

If the writer of the data is a high throughput writer, the method may proceed to step 304. If the writer of the data is not a high throughput writer, the method may proceed to step 306.

In step 304, a copy of the data specified by the data write request is sent to an accelerator pool of the data storage system. Once received by the accelerator pool, the data may be stored by the accelerator pool in the data storage system.

The method may end following step 304.

Returning to step 302, the method may proceed to step 306 following step 302 if the writer of the data is not a high throughput writer.

In step 306, a copy of the data specified by the data write request is sent to a data silo of the data storage system. The copy of the data may be stored in the data silo of the data storage system without impairing the resources of the accelerator pool.

In one or more embodiments of the invention, the copy of the data is stored in the data silos by storing a first copy of the data in a first data silo and storing a second copy of the data in a second data silo. The first copy and the second copy may be stored sequentially or in parallel without departing from the invention. For example, the first copy may be stored in the first data silo, the copy may be sent to the second data silo, and the second data silo may store the second copy in the second data silo after the first copy is stored in the first data silo. Alternatively, the first data silo may send a copy of the data to the second data silo before the first data silo stores a copy of the data. Both of the first data silo and the second data silo may store copies of the data in parallel, or at least, partially in parallel in this scenario.

The method may end following step 306.

As discussed above, an accelerator pool may send an acknowledgment of storing data in a data storage system to the clients. FIG. 3.2 shows a flowchart of a method in accordance with one or more embodiments of the invention. The method depicted in FIG. 3.2 may be used to process data storage acknowledgements in accordance with one or more embodiments of the invention. The method shown in FIG. 3.2 may be performed by, for example, clients (e.g., 100, FIG. 1.1). Other components of the system illustrated in FIG. 1.1 may perform the method of FIG. 3.2 without departing from the invention.

In step 310, after sending data to an accelerator pool, an acknowledgment is received from an accelerator of the accelerator pool indicating that the data is redundantly stored.

In one or more embodiments of the invention, the data is not redundantly stored when the acknowledgment is received. For example, the accelerator may send the acknowledgment before storing any other copies of the data in other accelerators, data silos, or entities in independent fault domains from that of the accelerator pool.

In step 312, without verifying that the data is redundantly stored and/or receiving an acknowledgment of the data silo confirming storage of the data, the client considers the data to be redundantly stored.

By considering the data to be redundantly stored, the client may take actions that would otherwise be barred when the data is not considered to be redundantly stored. For example, the client may modify the data in an irreversible manner. The actions may be other types of actions that would otherwise be barred when the data is not considered to be redundantly stored without departing from the invention.

The method may end following step 312.

To further clarify aspects of the invention, a non-limiting example is provided in FIGS. 4.1-4.12.

Example

Consider a scenario as illustrated in FIG. 4.1 where a client (450) sends an image file (452) to a data storage system (400) for storage. The data storage system (400) includes an accelerator (410), a first data silo (420), and a second data silo (430). The accelerator, first data silo, and second data silo each include a respective persistent storage (412, 422, 432).

When the data storage system (400) obtains the image file (452), the accelerator (410) stores a copy of the image file (453) in its persistent storage (412) as illustrated in FIG. 4.2. Before redundantly storing the image file, the accelerator (410) sends an acknowledgment (490) to the client (450). By doing so, the client (450) considers the image file to be redundantly stored by the data storage system (400) and, consequently, is able to schedule or otherwise perform additional data transactions with the data storage system (400) without waiting for the image file to actually be redundantly stored by the data storage system (400).

After storing the copy of the image file (453), the accelerator (410) sends the image file (452) to both data silos (420, 430) for redundant storage as illustrated in FIG. 4.3. Because of client preferences indicating the high importance of the image file (452), the accelerator (410) sends the image file (452) to both data silos (420, 430) for parallel storage. As seen in FIG. 4.4, a second copy of the image file (454) and a third copy of the image file (455) or stored in each data silo (420, 430) in parallel. Because the copies are stored in parallel, the total time for storing all three copies of the image file is reduced when compared to the storage time required to sequentially store all three copies of the image file.

At a second point in time, the client (450) sends an email (462) to the data storage system (400) for storage as illustrated in FIG. 4.5. Specifically, the email (462) is sent to the accelerator (410). In response to receiving the email (462), the accelerator (410) stores a copy of the email (463) and sends an acknowledgment (491) to the client (450) as illustrated in FIG. 4.6.

Based on the client preferences, the accelerator (410) proceeds to sequentially store copies of the email (462) in the data silos because of the low importance of the email (462) specified by the client preferences. To sequentially store the copies, the accelerator (410) sends the email (462) to the first data silo (420) as illustrated in FIG. 4.7.

In response to receiving the email (462), the first data silo (420) stores a second copy of the email (464) and sends the email (462) to the second data silo (430) as illustrated in FIG. 4.8. Upon receipt of the email (462), the second data silo (430) stores a third copy of the email (465) as illustrated in FIG. 4.9.

At a third point in time, the client (450) sends bookmarks (472) of a web browser to the data storage system (400) for storage as illustrated in FIG. 4.10. Specifically, the client (450) since the bookmarks (472) to the first data silo (420) rather than the accelerator (410). The client (450) sent the bookmarks (472) to the first data silo (420) because the web browser is not a high data storage throughput application. By doing so, the client (450) conserved the resources of the accelerator (410) for high data storage throughput applications.

In response to receiving the bookmarks (472), the first data silo (420) stores a copy of the bookmarks (473) and sends the bookmarks (472) to the second data silo (430) as illustrated in FIG. 4.11. Upon receipt of the bookmarks (472), the second data silo (430) stores a second copy of the bookmarks (474) as illustrated in FIG. 4.12. By doing so, the data storage system (400) redundantly stores the bookmarks without using resources of the accelerator (410).

End of Example

Any of the components of FIG. 1.1 may be implemented as distributed computing devices. As used herein, a distributed computing device refers to functionality provided by a logical device that utilizes the computing resources of one or more separate and/or distinct computing devices.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One more embodiments of the invention may improve data storage technology. For example, embodiments of the invention may improve a rate of data storage in a distributed system and/or may reduce latency for data storage in a distributed system. In one or more embodiments of the invention, a data storage system includes an accelerator pool that provides high throughput data storage services to clients. The high throughput data storage services may be provided by acknowledging storage of client data even when client data has not been redundantly stored. By doing so, embodiments of the invention may provide data storage services having reduced latency when compared to data storage services provided by contemporary data storage technology. In a distributed system where network bandwidth and latency is an issue that impacts the rate of data storage, embodiments of the invention may provide a substantially improved rate of data storage by compensating for the latency inherent in the distributed system.

Further, embodiments of the invention may address the problem of limited computing resources in a distributed system. For example, embodiments of the invention may provide architecture that provides high data storage throughput via an accelerator pool. In contrast, contemporary approaches may require all computing devices of a distributed system to be upgraded or otherwise have improved computing resources to improve data storage in the distributed system. Embodiments of the invention may address this problem by specifically allocating certain devices for providing high data throughput storage services and, consequently, may provide such benefits with only providing the allocated certain devices with high computing resource capabilities. By doing so, embodiments of the invention may decrease the cost of providing high throughput data storage services in a distributed system when compared to contemporary methods.

Thus, embodiments of the invention directly address problems arising due to the nature of modern technological environments of distributed systems. Specifically, as distributed systems increase in their use and general complexity, the cost of upgrading or otherwise maintaining the competing resource capabilities of distributive system increases.

Embodiments of the invention may address this problem by providing a carefully tailored allocation scheme that provides high throughput data storage services while minimizing the cost of maintaining or upgrading the computing resource capabilities of the distributed system.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data storage system, comprising:
an accelerator pool comprising memory and persistent storage; and
data silos,
wherein the accelerator pool is programmed to:
obtain a data storage request for first data;
store a copy of the first data locally in the memory;
in response to storing the copy of the first data and prior to the first data being stored in more than one fault domain and prior to any copies of the first data being stored in the persistent storage:
send an acknowledgement to a requesting entity that generated the data storage request; and
after sending the acknowledgement, store at least one second copy of the first data in the data silos,
wherein the acknowledgement indicates that the first data is redundantly stored in at least two different fault domains.

2. The data storage system of claim 1, wherein the accelerator pool and the data silos are in independent fault domains.

3. The data storage system of claim 1, wherein the data silos comprise:
a first data silo in a first fault domain; and
a second data silo in a second fault domain,
wherein the first fault domain is independent from the second fault domain.

4. The data storage system of claim 3, wherein storing the at least one second copy of the first data in the data silos comprises:
sending the first data to only the first data silo to sequentially store:
the at least one second copy of the first data in the first data silo; and
a third copy of the first data in the second data silo,
wherein the accelerator pool does not send the first data to the second data silo.

5. The data storage system of claim 4, wherein the second copy of the first data in the first data silo is stored via Remote Direct Memory Access (RDMA) of memory of the first data silo by the accelerator pool.

6. The data storage system of claim 4, wherein the third copy of the first data is stored in the second data silo after the second copy of the first data is stored in the first data silo.

7. The data storage system of claim 3, wherein storing at least the second copy of the first data in the data silos comprises:
sending the first data to both of the first data silo and the second data silo to, at least partially in parallel, store:
the at least one second copy of the first data in the first data silo; and
a third copy of the first data in the second data silo.

8. The data storage system of claim 1, wherein the accelerator pool comprises accelerators, wherein each of the accelerators comprises:
non-volatile random-access memory; and
persistent storage.

9. The data storage system of claim 8, wherein each of the accelerators is programmed to:
store the copy of the first data in the non-volatile random-access memory;
after storing the copy of the first data, send the acknowledgement; and
after sending the acknowledgement, migrate the copy of the first data to the persistent storage.

10. The data storage system of claim 1, wherein the data silos are programmed to:
obtain a second data storage request for second data;
store the second data in the data silos without storing any copies of the second data in the accelerator pool.

11. The data storage system of claim 10, wherein the second data is stored without utilizing any computing resources of the accelerator pool.

12. A method for storing data in a data storage system, comprising:
obtaining, by an accelerator pool comprising memory and persistent storage, a data storage request for first data;
storing a copy of the first data locally in the memory;
in response to storing the copy of the first data and prior to the first data being stored in more than one fault domain and prior to any copies of the first data being stored in the persistent storage:
sending an acknowledgement to a requesting entity that generated the data storage request; and
after sending the acknowledgement, storing at least one second copy of the first data in data silos,
wherein the acknowledgement indicates that the first data is redundantly stored in at least two different fault domains.

13. The method of claim 12, wherein storing the at least one second copy of the first data in the data silos comprises:
sending the first data to only a first data silo of the data silos to sequentially store:
the at least one second copy of the first data in the first data silo; and
a third copy of the first data in a second data silo of the data silos,
wherein the accelerator pool does not send the first data to the second data silo,
wherein the first data silo and the second data silo are in independent fault domains.

14. The method of claim 13, wherein storing the third copy of the first data in the first data silo comprises:
remotely directly accessing, by the accelerator pool, a memory of the second data silo; and
storing the third copy of the first data in the memory of the second data silo via the remotely directly accessing of the memory.

15. The method of claim 12, wherein the accelerator pool and the data silos are in independent fault domains.

16. The method of claim 12, wherein storing the at least one second copy of the first data in the data silos comprises:
sending the first data to both of a first data silo of the data silos and a second data silo of the data silos to, at least partially in parallel, store:
the at least one second copy of the first data in the first data silo; and
a third copy of the first data in the second data silo.

17. A non-transitory computer readable medium comprising computer readable program code, which when executed by a computer processor enables the computer processor to perform a method for storing data in a data storage system, the method comprising:
obtaining, by an accelerator pool comprising memory and persistent storage, a data storage request for first data;
storing a copy of the first data locally in the memory;
in response to storing the copy of the first data and prior to the first data being stored in more than one fault domain and prior to any copies of the first data being stored in the persistent storage:
sending an acknowledgement to a requesting entity that generated the data storage request; and
after sending the acknowledgement, storing at least one second copy of the first data in data silos,
wherein the acknowledgement indicates that the first data is redundantly stored in at least two different fault domains.

18. The non-transitory computer readable medium of claim 17, wherein storing the at least one second copy of the first data in the data silos comprises:
sending the first data to only a first data silo of the data silos to sequentially store:
the at least one second copy of the first data in the first data silo; and
a third copy of the first data in a second data silo of the data silos,
wherein the accelerator pool does not send the first data to the second data silo,
wherein the first data silo and the second data silo are in independent fault domains.

19. The non-transitory computer readable medium of claim 18, wherein storing the third copy of the first data in the first data silo comprises:
remotely directly accessing, by the accelerator pool, a memory of the second data silo; and
storing the third copy of the first data in the memory of the second data silo via the remotely directly accessing of the memory.

20. The non-transitory computer readable medium of claim 17, wherein storing the at least one second copy of the first data in the data silos comprises:
sending the first data to both of a first data silo of the data silos and a second data silo of the data silos to, at least partially in parallel, store:
the at least one second copy of the first data in the first data silo; and
a third copy of the first data in the second data silo.

* * * * *